(12) United States Patent
Sheng et al.

(10) Patent No.: US 9,141,196 B2
(45) Date of Patent: Sep. 22, 2015

(54) ROBUST AND EFFICIENT LEARNING OBJECT TRACKER

(71) Applicant: QUALCOMM Incorporated, San Diego, CA (US)

(72) Inventors: Tao Sheng, Toronto (CA); Alwyn Dos Remedios, Toronto (CA)

(73) Assignee: QUALCOMM INCORPORATED, San Diego, CA (US)

( * ) Notice: Subject to any disclaimer, the term of this patent is extended or adjusted under 35 U.S.C. 154(b) by 109 days.

(21) Appl. No.: 13/797,579

(22) Filed: Mar. 12, 2013

(65) Prior Publication Data

US 2013/0272570 A1  Oct. 17, 2013

Related U.S. Application Data

(60) Provisional application No. 61/625,080, filed on Apr. 16, 2012.

(51) Int. Cl.
| | |
|---|---|
| *G06K 9/00* | (2006.01) |
| *G06F 3/01* | (2006.01) |
| *G06T 7/20* | (2006.01) |
| *G06F 3/00* | (2006.01) |
| *G06F 3/0484* | (2013.01) |

(52) U.S. Cl.
CPC .............. *G06F 3/017* (2013.01); *G06F 3/005* (2013.01); *G06F 3/0484* (2013.01); *G06K 9/00355* (2013.01); *G06T 7/20* (2013.01); *G06T 7/2066* (2013.01); *G06T 2207/20016* (2013.01); *G06T 2207/20021* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 6,263,088 | B1 * | 7/2001 | Crabtree et al. | 382/103 |
| 6,332,038 | B1 | 12/2001 | Funayama et al. | |
| 6,542,625 | B1 | 4/2003 | Lee et al. | |
| 6,590,999 | B1 | 7/2003 | Comaniciu et al. | |
| 6,937,744 | B1 * | 8/2005 | Toyama | 382/103 |
| 7,058,209 | B2 | 6/2006 | Chen et al. | |
| 7,702,425 | B2 * | 4/2010 | Hougen | 701/1 |
| 7,756,296 | B2 | 7/2010 | Porikli et al. | |
| 7,817,822 | B2 | 10/2010 | Sun et al. | |
| 7,840,061 | B2 * | 11/2010 | Porikli et al. | 382/159 |
| 2005/0063568 | A1 | 3/2005 | Sun et al. | |
| 2011/0110560 | A1 | 5/2011 | Adhikari | |

(Continued)

OTHER PUBLICATIONS

Zhang X., et al., "Eye Location Based on Adaboost and Random Forests," Journal of Software, Oct. 2012, vol. 7 (10), pp. 2365-2371.

(Continued)

*Primary Examiner* — Nirav G Patel
*Assistant Examiner* — Ian Lemieux
(74) *Attorney, Agent, or Firm* — Kilpatrick Townsend Stockton LLP

(57) ABSTRACT

This disclosure presents methods, systems, computer-readable media, and apparatuses for optically tracking the location of one or more objects. The techniques may involve accumulation of initial image data, establishment of a dataset library containing image features, and tracking using a plurality of modules or trackers, for example an optical flow module, decision forest module, and color tracking module. Tracking outputs from the optical flow, decision forest and/or color tracking modules are synthesized to provide a final tracking output. The dataset library may be updated in the process.

44 Claims, 13 Drawing Sheets

(56) References Cited

U.S. PATENT DOCUMENTS

| | | | |
|---|---|---|---|
| 2011/0274315 A1 | 11/2011 | Fan et al. | |
| 2011/0293136 A1* | 12/2011 | Porikli | 382/103 |
| 2012/0078097 A1 | 3/2012 | Wang et al. | |
| 2012/0082381 A1 | 4/2012 | Maki et al. | |
| 2012/0201469 A1 | 8/2012 | Livet et al. | |
| 2012/0225719 A1 | 9/2012 | Nowozin et al. | |

OTHER PUBLICATIONS

International Search Report and Written Opinion—PCT/US2013/033182—ISA/EPO—Jun. 18, 2013.

Santer J et al., "PROST: Parallel Robust Online Simple Tracking,"2010 IEEE Conference on Computer Vision and Pattern Recognition (CVPR), Jun. 13-18, 2010, San Francisco, CA, USA, IEEE, Piscataway, NJ, USA June 13, 2010, pp. 723-730, XP031725970, ISBN:978-1-4244-6984-0.

Yang H et al., "Recent Advances and Trends in Visual Tracking: A Review", Neurocomputing, Elsevier Science Publishers, Amsterdam, NL, vol. 74, No. 18, Jul. 28, 2011 (200-07-28), pp. 3823-3831, XP028301666, ISSN: 0925-2312, DOI: 10.1016/J.NEUCOM.2011.07.024.

Comaniciu, et al., "Kernel-Based Object Tracking," IEEE Transactions on Pattern Analysis and Machine Intelligence, vol. 25, No. 5, May 2003, pp. 564-577.

Kalal, et al., "P-N learning: Bootstrapping binary classifiers by structural constraints," 2010 IEEE Conference on Computer Vision and Pattern Recognition (CVPR), 2010, pp. 49-56.

Lucas, et al., "An Iterative Image Registration Technique with an Application to Stereo Vision," From Proceedings of Imaging Understanding Workshop, pp. 121-130, 1981.

Safavian, et al., "A survey of decision tree classifier methodology," IEEE Transactions on Systems, Man, and Cybernetics, vol. 21, No. 3, May/Jun. 1991, pp. 660-674.

* cited by examiner

ROBUST AND EFFICIENT LEARNING OBJECT TRACKER

CROSS REFERENCE TO RELATED APPLICATIONS

The present application is a non-provisional of and claims the benefit and priority under 35 U.S.C. 119(e) of U.S. Provisional App. No. 61/625,080 filed Apr. 16, 2012, and entitled Robust and Efficient Learning Hand Tracker, the entire contents of which are incorporated herein by reference for all purposes.

BACKGROUND

This disclosure generally relates to the field of image processing, and more specifically, to image processing for the optical tracking of objects.

A variety of computing and camera applications require optical tracking of the position or movement of an object. For example, certain computer interfaces enable a user to control a cursor through hand movement sensed by a camera. These interfaces require the hand to be optically tracked with a high degree of accuracy, and without requiring an excessive use of computational resources.

Despite the need for reliable object tracking, known trackers have certain deficiencies. A variety of individual object tracking algorithms are available which have performance characteristics which vary depending on image conditions. There is a need for enhanced optical tracking performance and efficiency.

BRIEF SUMMARY

Certain methods, apparatuses and computer program products for optical object tracking are described. The techniques employed therein involve using an optical flow tracker (OFT) to detect data associated with an object within a first frame of image data and to calculate a first estimated image location of the object, wherein calculating is based on the detected data, using a decision forest tracker (DFT) algorithm to detect data associated with the object within the first frame of image data and to calculate a second estimated image location of the object based on the data detected using the DFT algorithm, determining a final image location based on at least one of the first bounding box or the second bounding box; and tracking the object using the final first frame bounding box.

According to one or more aspects of the present disclosure, an apparatus for optical object tracking is disclosed. The apparatus may comprise means for using an optical flow tracker (OFT) to detect data associated with an object within a first frame of image data and to calculate a first estimated image location of the object, wherein the means for using an OFT comprise means for calculating the first estimated image based on the data detected using the OFT. The apparatus may also comprise means for using a decision forest tracker (DFT) to detect data associated with the object within the first frame of image data and to calculate a second estimated image location of the object based on the data detected using the DFT, means for determining a final image location based on at least one of the first estimated image location or the second estimated image location, and means for tracking the object using the final image location.

Additionally an apparatus of the present disclosure may further comprise means for defining a first bounding box with respect to the first estimated image location, means for defining a second bounding box with respect to the second estimated image location, and means for determining a final bounding box with respect to the final image location.

Additionally or alternatively, the apparatus may comprise means for determining a first confidence metric representative of the reliability of the first bounding box, and means for determining a second confidence metric representative of the reliability of the second bounding box.

In accordance with one or more additional or alternative aspects of the present disclosure, the apparatus may comprise means for updating a learning library by providing data to the learning library, wherein the provided data is associated with at least one of data detected using the DFT or data detected using the OFT. Also, the means for determining a first confidence metric may comprise means for calculating the reliability of the first bounding box based on an amount of consistency between the data detected using the OFT and data stored in the learning library. Also, the apparatus may include means for determining the first confidence metric based on the reliability of the first bounding box.

Furthermore, in accordance with additional or alternative aspects of the present disclosure, the apparatus may be configured such that the means for determining the second confidence metric comprise means for calculating the reliability of the second bounding box based on an amount of consistency between the data detected using the DFT and data stored in the learning library, and means for determining the second confidence metric based on the reliability of the second bounding box.

This disclosure also provides that the apparatus may comprise means for ascertaining at least one of a shape, size, velocity or luminance of the object based on the data provided to the learning library; and means for storing said shape, size, velocity or luminance in the online library. Also, within the apparatus, the aforementioned means for determining the final image location may comprise means for determining the final image location to be within the second bounding box if the first confidence metric is less than a first predetermined threshold and the second confidence metric exceeds a second predetermined threshold, means for determining the final image location to be between the first and the second bounding box if the first confidence metric exceeds the first predetermined threshold and the second confidence metric exceeds the second predetermined threshold, and means for determining the final image location to be within the first bounding box if the first confidence metric exceeds the first predetermined threshold and the second confidence metric is less than the second predetermined threshold.

In an additional aspect, an apparatus may comprise means for analyzing a second frame of image data using the OFT, means for analyzing the second frame of image data using the DFT, means for using a color tracker to detect second frame data associated with the object within the second frame of image data, means for using the color tracker to calculate a third estimated image location of the object, wherein calculating is based on the second frame data associated with the object, means for defining a color tracker bounding box with respect to the third estimated image location, and means for determining a color tracker confidence metric representative of the reliability of the color tracker bounding box.

The present disclosure also provides a method for object tracking. The method may comprise determining whether a position of an object is determinable from an image based on information from an optical flow tracker, determining whether the position of the object is determinable based on information from a decision forest tracker, and determining the position of the object based on information from a color tracker when the position is neither determinable based on information from the optical flow tracker nor determinable based on information from the decision forest tracker.

According to additional aspects of the present disclosure, the method may involve determining whether the position of the object is determinable based on information from a given tracker by using a confidence of an estimated position of the object for the given tracker if that tracker can estimate the position of the object.

The method may also be used when the object comprises one or more hands. Additionally or alternatively, the method may comprise using the position from the optical flow tracker when the position is determinable with the optical flow tracker and not determinable with the decision forest tracker, using the position from the decision forest tracker when the position is determinable with the decision forest tracker and is not determinable with the optical flow tracker, or determining whether to use the position from the decision forest tracker or the position from the optical flow tracker, or whether to combine the position from the decision forest tracker and the position from the optical flow tracker when the position is determinable with both the decision forest tracker and the optical flow tracker.

Additionally, this disclosure provides a method comprising processing image information with a tracker configured for long-term tracking to determine whether a position of an object is estimable, processing the image information with a tracker configured for short-term tracking to determine whether the position of the object is estimable, and determining whether to process the image information with a tracker configured for use with color to estimate the position of the object based on a result of the processing of the image information with the tracker configured for long-term tracking and based on a result of the processing of the image information with the tracker configured for short-term tracking.

Furthermore, the method may be such that the tracker configured for long-term tracking comprises a decision forest tracker, the tracker configured for short-term tracking comprises an optical flow tracker, and the tracker configured for use with color is used to process the image information when the position of the object is estimable with neither the tracker configured for long-term tracking nor the tracker configured for short-term tracking.

Additionally, as disclosed herein, the method may comprise determining that the position of the object is not estimable with the tracker configured for short-term tracking, and using the tracker configured for long-term tracking to reinitialize the tracker configured for short-term tracking in response thereto. The method may be such that determining whether the position of the object is estimable with a given tracker is based on a confidence of an estimated position of the object for the given tracker if that tracker can estimate the position of the object. Also, the method may be used when the object comprises one or more hands.

Additional aspects of the present disclosure relate to a method which may comprise determining a confidence of a tracking result for each of a plurality of object trackers and determining whether to utilize an additional object tracker based on the determined confidences. The method may be such that at least one of the confidences comprises a confidence interval. Also, the tracking result may comprise an estimated position of a certain object for a given tracker if that tracker can estimate the position of the object.

This disclosure also provides image tracking methods which comprise processing image information with a tracker configured for long-term tracking to determine whether a position of an object is estimable, processing the image information with a tracker configured for short-term tracking to determine whether the position of the object is estimable, and determining whether to process the image information with a tracker configured for use with color to estimate the position of the object based on a result of the processing of the image information with the tracker configured for long-term tracking and based on a result of the processing of the image information with the tracker configured for short-term tracking.

The determined confidence used in the method may be approximately zero for a given tracker if that tracker cannot estimate a position of a certain object. Additionally or alternatively, the plurality of object trackers may comprise two or more trackers, and the two or more trackers may comprise a short-term tracker and a long-term trackers. In accordance with the method, the two or more trackers may comprise an optical flow tracker and a decision forest tracker, and the additional tracker may comprise a color tracker. Also, in accordance with the method the object trackers may be used to track one or more hands.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
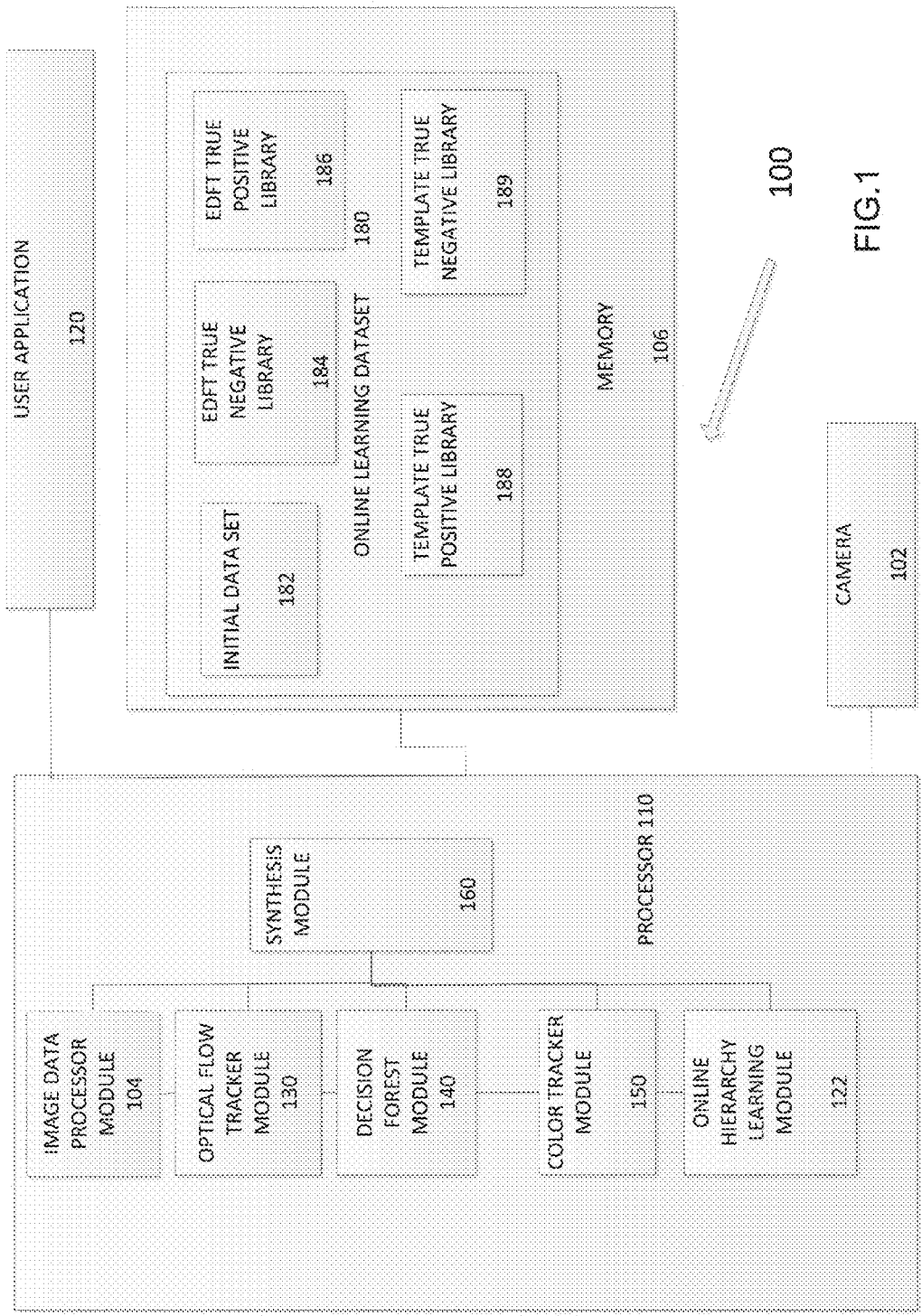
FIG. 1 is a block diagram depicting systems capable of using the methods presented herein to perform optical tracking of one or more objects.

FIG. 1 depicts an example object tracking device ("object tracker") 100 configured to implement the object tracking techniques of the present disclosure. Object tracker 100 may be a handheld camera, wireless telephone, smart phone, tablet, PDA, computer, television or any other device equipped with or configured to receive information from a digital camera or other optical detector capable of providing image data. Object tracker 100 may include a camera 102 which captures light and converts the light into a series of electrical signals. The electrical signals are captured and quantified at time intervals known as frames. Object tracker 100 may also include a memory 106 and a processor 110. For each frame, the electrical signals of the frame may be provided to the image data processor module 104, which converts the electrical signals to pixels. Following processing by the image data processor module 104, the pixels of each frame may be stored in memory 106 together with pixels of other frames. In some embodiments, the camera 102 is omitted. For example, this may be the case when the tracker 100 is configured to receive image data from another source, such as a camera remote from the tracker 100.

In some embodiments of the object tracker 100, camera 102 may be a depth camera, and the object tracker 100 may be used to control a computer or media hub based on the recognition of gestures or changes in a user's hand or movements. The camera 102 may have a low-resolution or low refresh rate, but may nonetheless be able to implement methods and techniques of this disclosure because of their efficiency and adaptability.

A depth camera, such as a structured light camera or a time-of-flight camera, may include infrared emitters and a sensor. The depth camera may produce a pulse of infrared light and subsequently measure the time it takes for the light to travel to an object and back to the sensor. Alternatively, camera 102 need not be capable of measuring depth, and may be a 2-dimensional (2D) camera that receives visual image data as a 2-dimensional image.

Memory 106 may include various libraries which may be accessed and used by processor 110 and/or tracking modules 130, 140, 150. For example, a learning dataset 180 may reside within memory 106. The learning dataset may contain historical image data and tracking data which may be referenced by various components of the object tracker 110 for the purposes of machine learning, synthesizing tracking information, and performing steps or computations associated with any of the algorithms disclosed herein.

The learning dataset may be updated periodically based on calculations or determinations performed within the hierarchy learning module 122. The learning dataset may include an initial dataset 182 containing data which facilitates the initial detection and tracking of an object. The learning dataset may also include an EDF true negative library 184, EDF true positive library 186, template true positive library 188, and template true negative library 189. These libraries may be utilized by, included within, and/or implemented by any or all of the processing, tracking, synthesis and learning components and modules 104, 110, 130, 140, 150 and 122.

The image data processor module 104 may be a part of processor 110, or may exist as an independent processing unit. Processor 110 may include and/or control or access several modules which provide image data processing for determining and tracking the position or motion of one or more objects within the field of view of camera 102. The one or more objects may be controlled by a user capable of interfacing with user application 120 through the object tracker 100. User application 120 may be any type of application capable of using tracking data associated with objects tracked by object tracker 100. By way of example only, user application 120 may be software or a control interface designed to operate in response to changes in the image data gathered by camera 102.

There are many ways the software or control interface may use the tracking data. In one example, software may focus a camera, position a lens, or perform other photographic functions based on recent positions of features present within the image data. A control interface may operate based on the tracked position of an object (e.g. finger, hand, etc.) detected within the image data. In this way, the interface could enable a user to scroll through menus, position a mouse, or control screen icons by moving one or more hands, fingers or the like so as to be tracked by the object tracker, thereby causing interface control inputs to be generated.

The processor modules which provide image processing for determining and/or tracking position or motion may include the optical flow tracker (hereinafter "OFT") module 130, decision forest tracker (which is described herein as an enhanced decision forest tracker and hereinafter referred to as an "EDF") module 140 and color tracker (hereinafter "CT") module 150. These processing modules may reside within processor 110, or may be externally located with respect to the processor. Any other modules or combinations of modules having design, functionality or performance characteristics similar to the OFT module, EDF module or CT module 130, 130, 150 may be used in place of, or in addition to any of the modules 130, 140, 150. Additionally, the techniques and methods described herein may enable, amongst other results, reliable machine learning in an object tracking environment, a sharing of processing resources amongst independent processing modules, a reduction of computational complexity associated with object tracking, and/or a robust and efficient integration of multiple object tracking modules (e.g. object tracking modules 130, 140 and 150) into a single object tracker. These techniques are widely adaptable and will be easily recognized as suitable for implementation in a variety of object tracking mechanisms differing in or more ways from the example embodiments and implementations described in detail herein. For example, any technique or combination of techniques disclosed herein will be readily understood as being easily applicable within a variety of the object tracking mechanisms which are conceivable by a normally skilled artisan and which incorporate machine learning, multiple tracking algorithms, synthesis of independent or quasi-independent tracking results, or the like. This disclosure is fully intended to cover such alternative implementations of the techniques herein described. Moreover, the detailed implementations and elaborations of concepts provided herein are provided for exemplary and explanatory purposes only, and are not intended to restrict the scope of the disclosure.

The OFT, EDF and CT modules 130, 140, 150 may each independently access frames of image data stored in memory 106, and provide frame-by-frame processing for object detection and tracking. Each of these modules may also be configured to independently output a bounding box ("BB") which can be used as a tracking mechanism, and which represents an estimated position of a tracked object.

In accordance with this disclosure, the OFT and EDF modules 130, 140 may be used as primary tracking modules. The CT module 150 may be used as a secondary tracking module under certain conditions, for example when both the OFT and EDF module 130, 140 fail to provide a reliable bounding box for object tracking. For this reason, the OFT and EDF modules 130, 140 will hereinafter be referred to as the "primary tracking models" when reference is made to both modules as a group.

In image tracking techniques known in the art, tracking information may be useful as valid input or control data for a user application. However, because image tracking algorithms are inherently imperfect, an image tracking bounding box may frequently be erroneous when it is determined using only a single algorithm or method. Similarly, when an image of the object is present, a module executing only a single detection and tracking algorithm may fail to return a bounding box. These faults may be most prevalent when the image of a tracked object is small, rapidly moving, similar to the background, or rapidly changing in appearance.

The present disclosure addresses this problem by synthesizing tracking outputs independently provided by the OFT module, EDF module and CT module (hereinafter, these three models will be referred to as "the tracking modules") 130, 140, 150 in a manner formulated based on the strengths and weaknesses of the algorithms associated with each of these modules. Synthesis of the OFT, EDF and CT bounding box outputs is provided by synthesis module 160. Synthesis module 160 may be configured to output a final bounding box or other locational information which represents the synthesized outputs from the tracking modules. Additionally, synthesis module 160 may refrain from generating a final bounding box for a frame in which the tracking modules fail to provide tracking outputs, provide inconsistent tracking outputs or otherwise provide tracking outputs which are accompanied by a low confidence indication or are evaluated by the synthesis module 160 itself as being unreliable ("low confidence").

In accordance with the present disclosure, a bounding box may be understood to be information describing a continuous body of pixels within a frame. In some implementations, a bounding box may be rectangular, but other shapes may also be used in accordance with this disclosure. The bounding box may be understood as representing an algorithmic determination that an image of the tracked object is included in the body of pixels described by the bounding box. For example, when the CT module 150 is used to analyze a frame of image data, the module analyzes the frame data to detect an object so that it may be tracked. If an image is detected, the CT module 150 outputs a CT bounding box corresponding to the image data. Similarly the OFT and EDF modules 130, 140 can output OFT and CT bounding boxes, respectively, in response to detecting an image of the object in an analyzed frame.

In certain embodiments, the OFT, EDF and CT modules 130, 140, 150 may be designed to output bounding boxes having a shape determined in light of the typical shape or structural characteristics of the object which the tracker is configured to track. For example, in implementations in which the object tracker 110 is designed to track a hand, the modules 130, 140, 150 may be designed to provide square, rectangular or approximately circular bounding boxes which surround the image location of the entire hand or the image location of the palm, fingers, and/or fingertips. In implementations for tracking a human face, the modules 130, 140, 150 may be designed to output oval or rectangular bounding boxes positioned so as to circumscribe the chin, mouth, eyes, nose or any combination of facial features, for example the entire face, at the tracked image location of features.

The object tracker 100 of the present invention may use bounding boxes in processing operations to represent location estimates of one or more tracked objects. The object tracker also may output bounding box information for each processed frame in which an object is tracked. These outputted bounding boxes may be used to determine a machine response to the tracked object. For example, in a video camera application the bounding box information could be used to focus the lens or detect facial features or moving objects in the image. In an image-based computer interface application, the bounding box could be used to detect and interpret the control gestures or inputs provided by a user operating a computer through the camera. For example, a user could move a hand in front of the camera to control a mouse. In this case, the bounding box could indicate where the mouse should be placed on the screen.

Tracking with bounding boxes may have several computational benefits. For example, the present disclosure will provide a detailed description of how the EDF module 140 and OFT module 130 may be configured to independently determine tracking information for a frame. The bounding boxes outputted by these modules may be easily compared to determine the consistency between the tracking results of the two modules, and to compare the tracking results of the modules to the final bounding box (final tracking determination) of the synthesis module. When rectangular bounding boxes are used, the approximately rectangular and continuous bounding box shape may enable the amount of overlap of OFT, EDF and/or final bounding boxes for a frame to be easily determined using minimal calculations. Moreover, the presence or absence of overlap between the various bounding boxes, as well as the amount of overlap, may provide a simple and reliable way of determining whether the independent EDF and OFT tracking results are consistent and reliable, or inconsistent and unreliable.

In certain embodiments, the OFT, EDF and CT modules 130, 140, 150 and the synthesis module 160 may be configured to output tracking information using different output formats. For example, outputted tracking information could be provided by specifying a single pixel at a location in the center of a tracked image. As additional examples, tracking information could be described using mathematical formulas or a displacement vector indicating a position relative to a known or fixed reference point within a frame of image data.

Figure 1A:
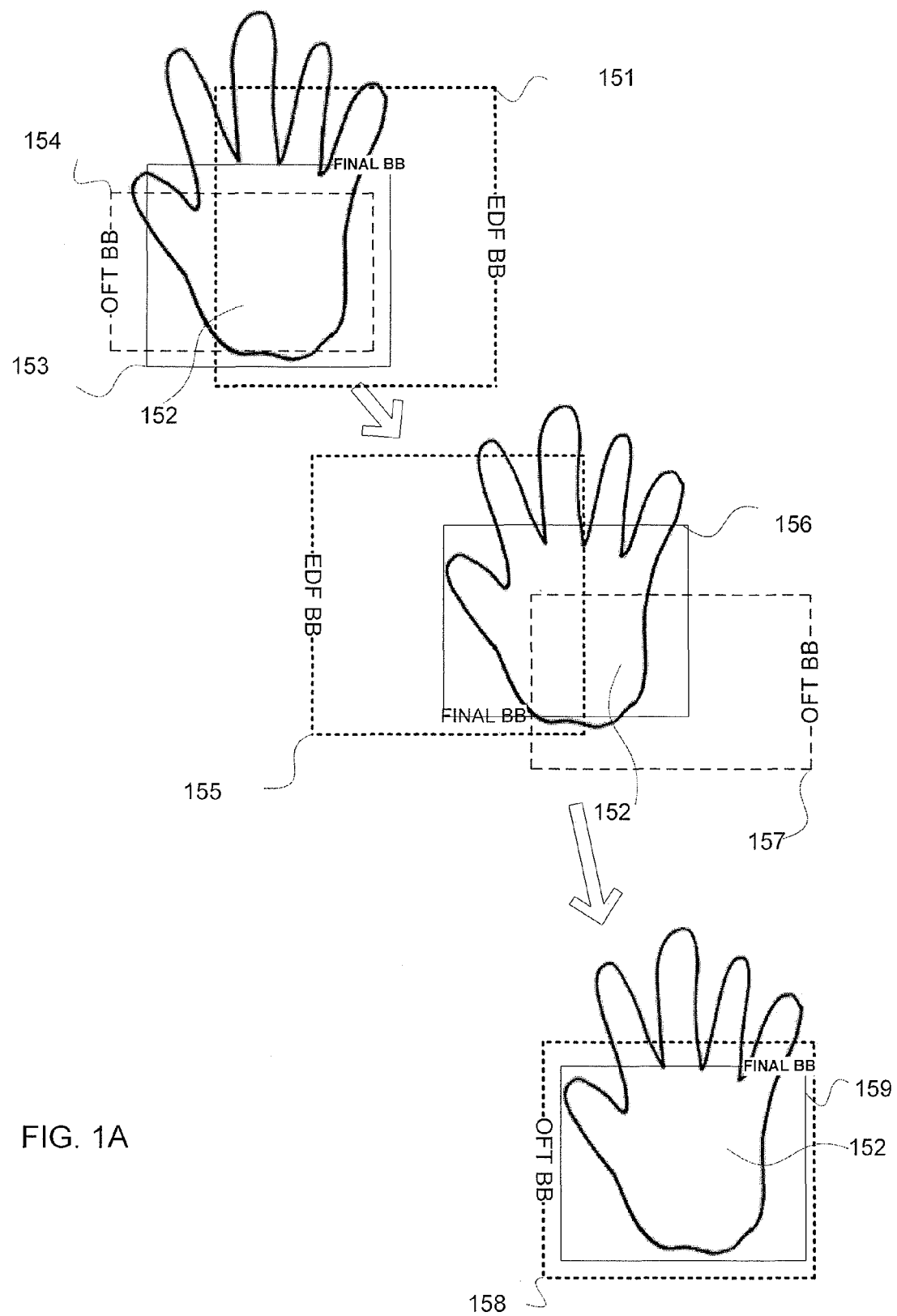
FIG. 1A illustrates tracking using bounding boxes, in accordance with techniques described herein.

FIG. 1A is an illustration of how bounding boxes may be used to track a moving hand. The hand 152 shown in FIG. 1A is depicted while being tracked by each of the primary tracking modules 130, 140. Also, the hand 152 is depicted as being moved downwards and towards the right side of the page. At the first, uppermost depicted position, EDF and OFT bounding boxes 151, 154 track the hand with some degree of inaccuracy. However, by synthesizing these bounding boxes in accordance with the present disclosure, synthesis module 160 is able to output a final bounding box 153 which accurately surrounds the palm of the hand.

At a later time after the hand is moved to the second position depicted in FIG. 1A, the tracking modules compute new bounding boxes for a subsequent frame which coincides with the second depicted hand location in the middle of FIG. 1A. For example, new OFT and EDF bounding boxes are depicted at 157 and 155. Here again, synthesis module 160 computes a final bounding box 156 based on the EDF and OFT bounding box inputs 155, 177.

FIG. 1A depicts that the hand 152 is moved to a third location. However, in analyzing the frame corresponding to this location, the EDF module 140 fails to provide a bounding box. Nonetheless, because the OFT module 130 calculates a high confident bounding box 158, the synthesis module 160 is able to determine an accurate final bounding box 159 based on the OFT input.

Figure 1B:
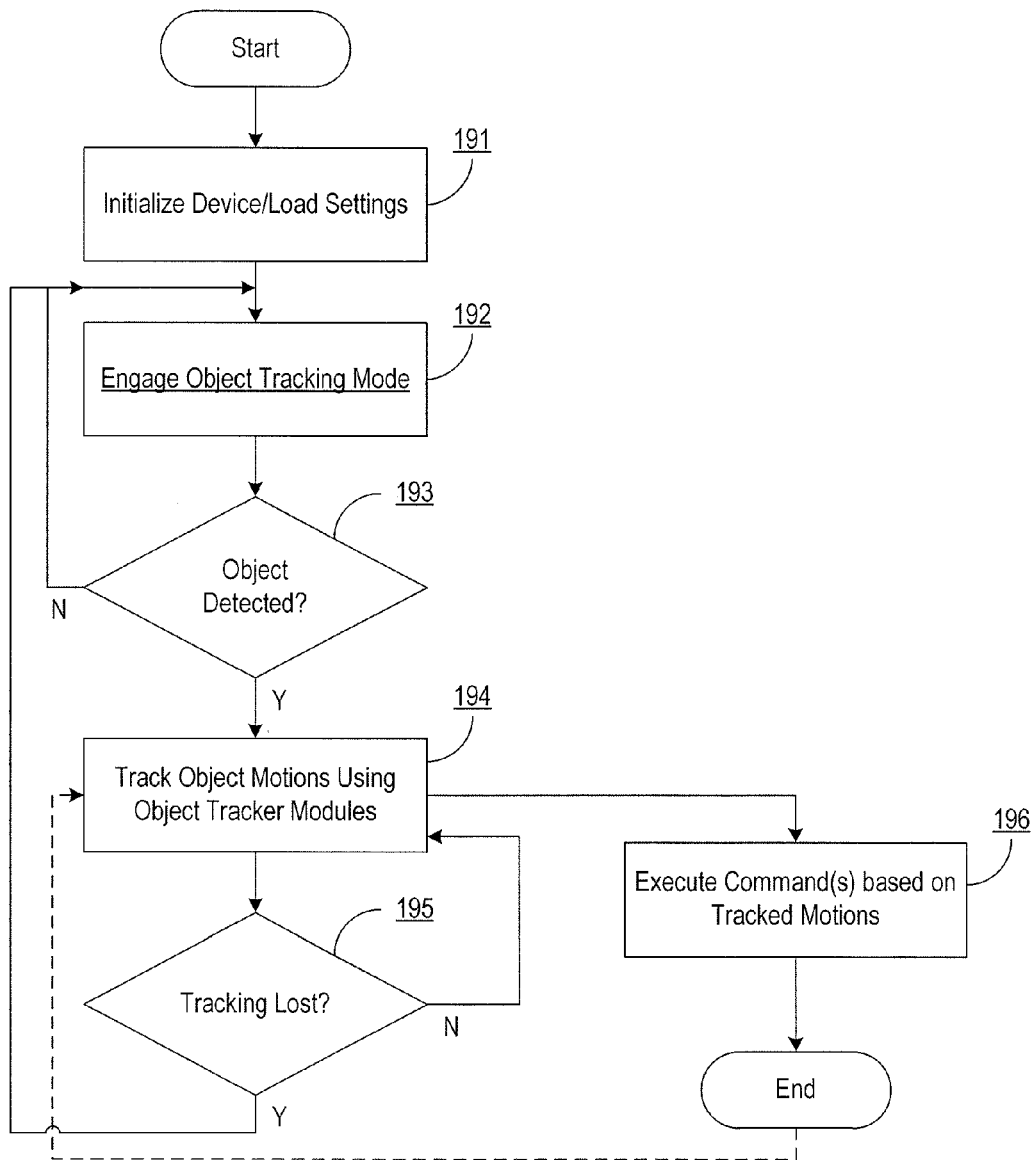
FIG. 1B depict an example sequence of operations which may be used by an object tracker of the present disclosure.

FIG. 1B is an example flow chart providing a generalized depiction of one of the many operational sequences which may be utilized by an object tracking device of the present disclosure. The example object tracker 100 depicted in FIG. 1 may be configured to execute the operations depicted in FIG. 1B. Without limiting the scope of this disclosure, the following description of FIG. 1B will include references to certain components of object tracker 100 for explanatory purposes only. Starting at block 191, the object tracker is first initialized. Settings may need to be loaded in the tracker, including software updates or running software routines. At block 192, the object tracker enters into Object Tracking Mode. This may include turning on one or more cameras and directing the one or more cameras in an initial direction towards an expected position of a hand or other object intended to be tracked. The object tracker may employ various techniques for initially detecting and/or locating and/or identifying the object to be tracked. While certain exemplary techniques are disclosed and suggested herein, the scope of this disclosure is not intended to be limited to these mentioned techniques.

At block 193, a decision branch is employed. The branch involves determining whether the object tracker has accurately identified an object intended to be tracked. If a positive determination is made, then the object tracker executes procedures described at block 194. If a negative determination is made, then the object tracker continues to try to detect, locate, or identify an object or hand to be tracked, as depicted at 192.

At 194, the object tracker may employ the tracking modules 130, 140, 150 to track to the previously detected object. For example, the OFT module 130, DFT module 140 and CT module 150 may analyze frames of image data using certain of the machine-learning techniques and other methods disclosed herein, in order to reliably and efficiently track hands or other objects.

At 195, the object tracker 100 determines whether tracking of the object has failed or been interrupted. Failed or interrupted tracking may occur because of rapid, drastic or abrupt object movement, or movement of the object beyond the camera field of view. In these cases, the object tracker may seek to again detect the object or a different object, so that subsequent tracking may take place. If tracking has not been lost, then block 195 flows back to block 194, where the Object Tracker continues to track the motions of the object.

Referring to block 196, at various points in tracking, extra modules, methods, software, or devices may interpret a motion or series of motions tracked by object tracker 100, and may use the interpretation to determine whether a command is signaled. For example, user application 120 may process tracking outputs from synthesis module 160 to determine a user's commands regarding the position of a mouse, cursor or other input mechanism. The methods employed to determine such commands are varied and numerous, and embodiments may employ any of these methods to determine such commands.

Figure 1C:
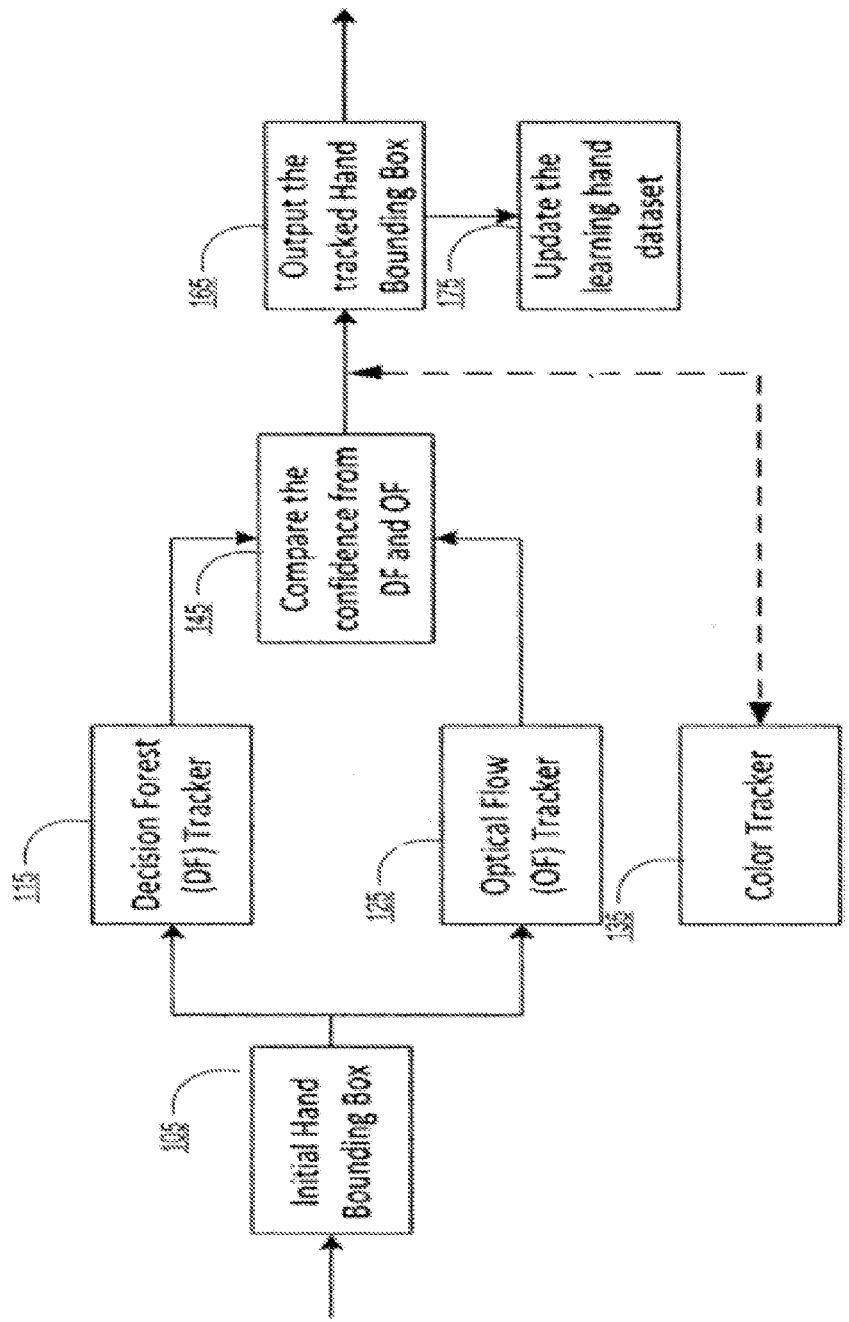
FIG. 1C illustrates a generalized depiction of certain of the processes which, in accordance with this disclosure, may be employed by an object tracker to analyze a frame of image data.

FIG. 1C illustrates a generalized depiction of certain of the processes which, in accordance with this disclosure, may be employed by an object tracker to analyze a frame of image data. An object tracker such as object tracker 100 in FIG. 1 may be suitable for, and configured to execute the processes depicted in FIG. 1C. FIG. 1C is drawn to show processes associated with the analysis of a single frame of image data in which an object is successfully detected and tracked. In actual operations, not all frames will result in the detection and tracking of an object and, thus, certain operations or steps depicted in FIG. 1C should be understood as not being fully applicable to those frames. Further, certain of the operations or steps may be omitted from FIG. 1C; for example, functions or operations of the color tracker at 135 may omitted based on the comparison of the confidence metrics at 145. FIG. 1C also should not be understood as depicting an iterative sequence of processes applicable to tracking across many frames. However, although not depicted, the general processes of FIG. 1C may be incorporated into a larger iterative tracking process (not depicted in the figure) by being repeated over the course of many frames. In such a case, the analysis of any single frame in a frame sequence may be performed using one iteration of the processes of FIG. 1C. Furthermore, the processes depicted in FIG. 1C are for explanatory purposes only and represent only one of the many available sequences and combinations of interchangeable processes and methods which are described and covered by this disclosure.

Starting at block 105, a device such as object tracker 100, first identifies an object to be tracked. An initial bounding box may be determined by a processing module such as image data processing module 104. Alternatively, a bounding box may be provided by software or image processor module 105. The entire object may be bounded, or just a portion of the object may be bounded for tracking purposes. Block 105 may be understood as referring to one example technique for engaging object tracking, as described in FIG. 1B. The remaining blocks may be understood as depicting methods or steps for providing tracking once an objected which is intended to be tracked is detected.

Referring to block 125, once a hand is identified and bounded, a first tracking module is employed in an attempt to track the object. In accordance with an aspect of this disclosure, it may be advantageous to design the object tracker 100 or other object tracking device such the first tracking module is a processing module or component with the ability to provide robust short-term object tracking. An example of a tracker with good short-term tracking characteristics is OFT module 130. The OFT module 130 works as a short-term hand tracker based on certain points of motion of the hand. The OFT module 130 may be particularly useful when the hand is in view of the camera, and may be deactivated when it is determined that the hand or object has fallen out of view. The OFT module 130 may track a number of points (e.g. 10×10 matrix of pixels) between consecutive recorded frames and estimate the displacement of the hand or object to determine subsequent next movement. The OFT module 130 may use the Lucas-Kanade optical flow algorithm, which is an optical flow tracking algorithm that is readily accessible to those with ordinary skill in the art. In accordance with this disclosure, other optical flow algorithms may be alternatively employed without limitation.

Also, at 115, a second module or component 140 is also used to track the object as it moves. This second processing module or component may be a processing module such as EDF module 140. Alternatively, other modules may be used. Where another such alternative module is used, it may be beneficial to implement the module so that it will be resistant to shape change, and thereby capable of providing accurate long-term tracking results.

As will be explained in greater detail in subsequent paragraphs, the EDF module 140 uses decision tree algorithmic analysis. The EDF module 140 is robust in the sense that it is tolerant to shape changes of a tracked hand or object. The robustness is due to the EDF module's use of FERN features of the tracked object, which are utilized so that the EDF module 140 may be able to provide tracking even when an object changes shape (e.g. open fist, closed fist, turning sideways, fanning fingers, etc.). In some embodiments, features other than FERN features are utilized. The EDF module 140 may reference a large decision tree which stores information descriptive of many shapes of the object. Using this information, the EDF module 140 may recognize the object based on comparing the object shape to many pre-existing shapes in the decision tree database. Where an object shape is not yet identified, the EDF module 140 may employ machine-learning techniques to add information about the newly detected shape into the database. This methodology may enable long-term hand tracking to be sustained with increased accuracy.

When an OFT tracker is combined with a decision forest tracker, an object tracker may be able to achieve both short-term and long-term object tracking solutions with better results than are attained with pre-existing tracking methods.

Referring to block 145, confidence metrics provided by the DF tracker at 115 and the OF tracker at 125 may then be compared to verify that the hand or object is being tracked accurately and to determine if and where a final bounding box should be outputted. Both the DF tracker at 115 and the OF tracker at 125 may determine and provide confidence metrics which may be expressed as degrees of confidence or percentages. The comparison of the confidence metrics may serve to ensure that the tracking outputs of the OF tracker 125 and DF tracker 115 are accurate. However, if the confidence metrics are below a certain threshold, the object tracker may determine that tracking has failed. At this point, the color tracker at 135 may be employed to perform processing for object tracking.

The color tracker at 135 may be used to model the surface color of an object and enable further tracking when both the DF tracker 125 and OF tracker 125 fail to track the object. A color tracker such as the one at 135 is able to track a non-rigid hand even when the hand is undergoing significant change of shape, and also can validate a historical dataset such as learning dataset 180 to promote accuracy in the dataset. A color tracker such as the one at 135 may rely on a mean-shift algorithm in processing tracking information.

Referring to block 165, once a hand or object has been determined to be tracked, its position may be indicated by an outputted bounding box, or using another method. This output may be provided to an application, processor or module capable of using tracking information. For example the output may be provided to a user application such as the one depicted at 120.

Referring to block 175, in addition to outputting calculated position information related to the tracked object, the tracking information may be used to update a machine-learning database within the object tracker 110. This updated information is stored for future access by the EDF module 140, and may be used in processing future frames. For example, if the tracked object has exhibited a new position or shape, then the database may be updated with information describing the new shape so that the object may be more easily detected and tracked in subsequent frames. In later frames (not depicted), the information in the library may be compared with the tracking results or intermediate computations yielded by the DF tracker 310 and the OF tracker 315, and the comparison result may be used to refine tracking calculations and determinations, determine tracking confidence metrics, or synthesize the tracking results.

As will be explained in greater detail in later paragraphs, the present disclosure provides techniques for frame-by-frame adaptive learning. The adaptive learning may be based, at least in part, on overlap (e.g. locational similarity) between the OFT and EDF bounding boxes of a frame, and overlap between EDF bounding boxes and the final bounding box determined by the synthesis module 160 for the same frame. When overlap occurs, the tracking module may save image information and position information depicting the overlapping location and the image at the location. This information may be used later to facilitate refinement of the tracking analysis performed by the OFT and EDF modules 130, 140, improvements in the synthesis of the tracking module outputs, and more accurate final bounding boxes and object tracking.

The following paragraphs will most closely refer again to FIG. 1 in describing the storage of data when the object tracker 100 is used. Information resulting from the adaptive learning process is stored in the online learning dataset 180. In subsequent discussion herein, the term "online" is meant to refer to a readily accessible nature rather than a connection or association with the internet, a server or cloud storage, and in some embodiments may refer to a realtime process.

Nonetheless, all memory components and libraries described herein may exist or incorporate elements external to object tracker 100. For example, memory 106 is depicted in FIG. 1 as residing within object tracker 100. However, this disclosure should not be understood as being limited to such an arrangement. Rather, any of the components shown in FIG. 1 or elsewhere in this disclosure may reside separate and apart from object tracker 100 and/or camera 102. For example, any of the processing components, modules or memory locations or libraries may exist at an external entity. An external entity may be a remote server, a remote host computer, or any other remote device capable of performing the methods or processes described herein. Further, in some embodiments, elements or processes that are referred to as online may be include post-processing or processing of stored or non-real-time data or information.

The online learning dataset 180 is divided into several libraries which may be updated depending on the stage of optical tracker operations. These libraries include the initial data set 182, the EDF true negative library, 184, EDF true positive library 186, template true positive library 188, and template true negative library 189.

Information in the EDF true negative library 184 and EDF true positive library 188 may be referenced by the EDF module 140 during the analysis of a frame. The information in these libraries may enable the EDF module 140 to improve its object detection resolution and minimize false tracking or erroneous detection of objects, thereby improving the quality of EDF bounding boxes provided to the synthesis module 160. In certain embodiments of the present disclosure, the EDF module 140 may additionally use information in the template true negative library 189 and template true positive library 188. Additionally, these libraries may be used by the synthesis module 160 to calculate confidence metrics for OFT and CT bounding boxes. During the process of calculating a final bounding box, these confidence metrics may be used by synthesis module 160 to determine the appropriate synthesis of bounding boxes from the tracking modules 130, 140, 150.

The online learning dataset 180 may be configured to be empty upon tracker startup. Subsequently, the online learning dataset 180 may be provided with an initial set of data provided by the image data processor module 104. This initial set of data may be obtained by analyzing several initial frames prior to activation of the tracking modules 130, 140, 150 so as to gain an initial data set which depicts relevant image conditions. For example, the image data processor 104 may be configured to provide information relevant to defining the image background, image foreground, prominent features or objects in the image, occlusions, lighting features, shadows, object movements, or any other information which may assist the EDF and CT modules 140, 150 in detecting objects and providing initial bounding EDF or CT bounding boxes.

In subsequent frames, after the tracking modules are activated, the online learning dataset 180 is further updated by the online hierarchy learning module 122, which may be disposed within processor 110. The online hierarchy learning module 122 may be configured to accept a final bounding box from the synthesis module 160 as an input, and to update the online learning dataset 180 based on the final bounding box location and tracking results from any of the tracking modules 130, 140, 150.

As will be explained in greater detail in later paragraphs, the template true positive library 188 and true negative library 189 are online learning dataset 180 libraries which store information depicting prominent features within windows of frames previously analyzed by EDF module 140. More specifically, the true negative template and true positive templates store feature information previously found within "true negative" EDF bounding boxes and "true positive" EDF bounding boxes, respectively. Taking a presently analyzed frame x as a point of reference, the set of EDF true negative bounding boxes is a subset of the set of all the EDF bounding boxes previously outputted by the EDF module during analysis of prior frames x−1, x−2, etc. Similarly, the set of EDF true positive bounding boxes is a subset of the set of all the EDF bounding boxes previously outputted by the EDF module 140 during analysis of prior frames x−1, x−2, etc.

Certain EDF bounding boxes may be determined to belong to the set of true negative EDF bounding boxes or the set of true positive bounding boxes based on online hierarchy learning analysis performed after an EDF bounding box and synthesis module 160 final bounding box are outputted for a frame. The online hierarchy learning analysis that identifies EDF true negative bounding boxes and true positive bounding boxes is performed conditionally, and on a frame by frame basis. The analysis may involve identifying an EDF bounding box as a true negative or true positive bounding box based on the proximity of the EDF bounding box to the final bounding box outputted by synthesis module 160. For example, in accordance with one possible method for identifying true positive and true negative bounding boxes, for either categorization to occur, and EDF bounding box must be for a frame for which a high confidence OFT bounding box has been determined. In these frames, true negative bounding boxes may be EDF bounding boxes which fail to overlap the final bounding box determined by synthesis module 160. True positive bounding boxes may be EDF bounding boxes which do overlap the final bounding box determined by synthesis module 160.

The online hierarchy learning module 122 may update the online learning dataset 180 in two stages. A first stage involves identifying portions of a frame (windows) associated with false positive (erroneous) bounding boxes generated by the EDF module 140, and saving information identifying these windows in the EDF true negative library 184 within the online learning dataset 180. The EDF module 140 may use the information in the EDF true negative library 184 to minimize erroneous outputs of bounding boxes at windows corresponding to the location of previous false positive tracking. The second stage of online hierarchy module updating occurs when an outputted OFT bounding box is evaluated with high confidence by synthesis module 160. In this updating stage, the online hierarchy learning module 122 updates the EDF true negative library 184, EDF true positive library 186, template true positive library 188, and template true negative library 189.

Figure 2:
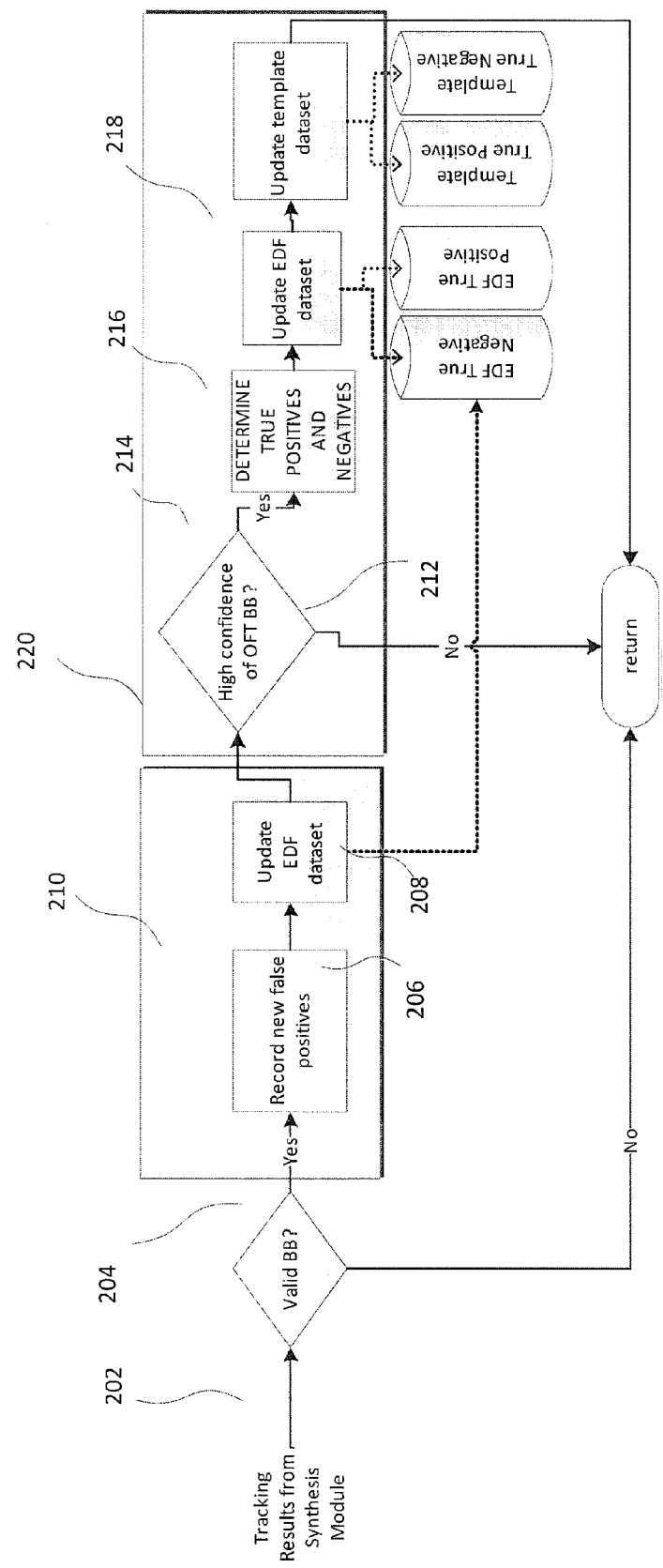
FIG. 2 is a flow diagram depicting an example process for updating an online learning dataset library, in accordance with the present disclosure.

FIG. 2 depicts example operations for online hierarchy learning module 122 updating of the online learning dataset 180. The processes depicted in FIG. 2 are for explanatory purposes only. The depicted sequence of processes represents only one of the many available and recognizable sequences and combinations of interchangeable processes and methods which are described and covered by this disclosure.

As depicted in FIG. 2, the online hierarchy learning module 122 may perform online learning dataset 180 updates in two stages. The first stage, as depicted at 210, is the false positive elimination stage. The second stage, as depicted at 220, is the learning refinement stage. For each frame, following analysis and tracking by the tracking modules and synthesis by the synthesis module 160, the OHL 122 receives tracking results from the synthesis module at 202. The tracking results include any OFT and EDF bounding boxes generated for the most recent frame, as well as the final bounding box, if one was generated. As depicted at 204, in conjunction with 208, the OHL 122 does not update the online learning dataset 180 if a final bounding box is not received from the synthesis module 160. If a final bounding box is received at 204, the OHL 122 compares the position of any received EDF bounding boxes to the position of the final bounding box at 206. EDF bounding boxes which do not overlap the final bounding box are characterized as false positive bounding boxes. At 208, the OHL 122 updates the EDF true negative library with information describing the locations of the false positive bounding boxes.

At 212, the OHL 122 determines whether a high confidence OFT bounding box for the most recent frame was received from the synthesis module at 202. If the OHL 122 determines that a high confidence OFT bounding box was received, it does not perform the second stage of the updating process and instead returns to 202 to await subsequent tracking results for future frames. However, if the OHL 122 determines that a high confidence OFT bounding box was received, it initiates the second updating stage by again identifying EDF bounding boxes which overlap the final bounding box at 214. EDF bounding boxes which do not overlap the final bounding box are characterized as true negative bounding boxes, while bounding boxes which do overlap the final bounding box are labeled true positive bounding boxes.

At 216 the OHL 122 updates the EDF template true positive library 188 and EDF template true negative library 189 with the true positive and true negative bounding box locations determined at 214. Furthermore, the OHL 122 updates the template true positive and template true negative libraries 186, 184 by providing feature information about the true positive and true negative bounding boxes ascertained at 214.

Figure 3:
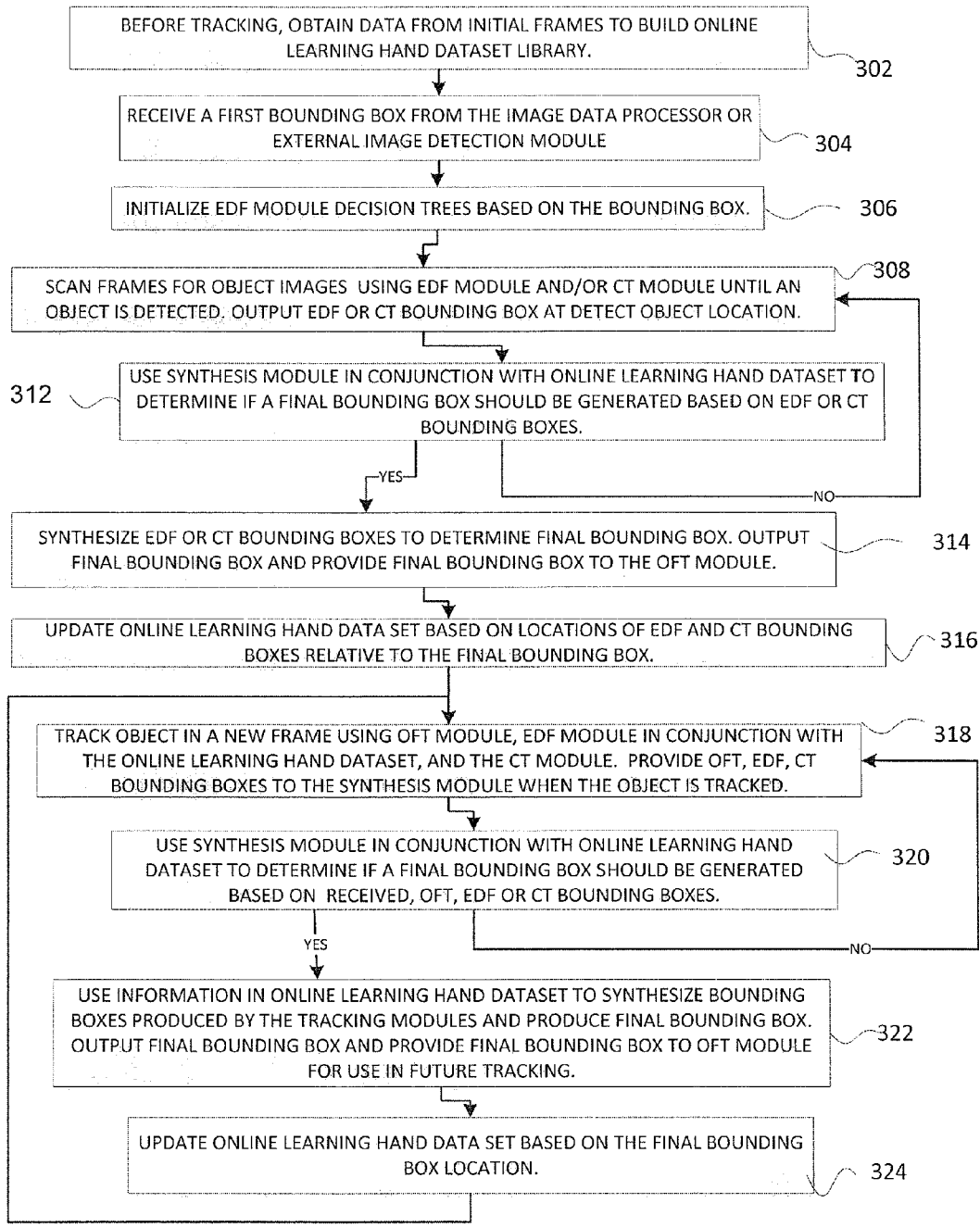
FIG. 3 is a flow diagram depicting example operations of the object tracker disclosed herein.

FIG. 3 is a generalized flow diagram depicting certain operations of the object tracker 100, beginning with its startup and continuing through its analysis of subsequently obtained frames of image data. Many of the operations described in FIG. 3 will be described in greater detail, and in conjunction with specific explanations of object tracker modules and components, in later paragraphs. The processes depicted in FIG. 3 are for explanatory purposes only and represent only one of the many available sequences and combinations of interchangeable processes and methods which are described and covered by this disclosure.

As depicted, at 302 the object tracker obtains initial frames of image data before the device commences tracking. It uses these frames to build an initial dataset in the online learning dataset 180. As an alternative to the acquisition of the initial frames and the building of the initial dataset depicted at 302, an object tracker may be encoded or provided with an initial data set. In this case, the object tracker may use the initial frames to refine the initial data set, or may execute subsequent processes without altering the initial data set. In some embodiments, 302 is omitted from the operations of the object tracker 100 described by FIG. 3

At 304, the object tracker 100 also receives a first bounding box calculated by the image data processor 104 or other external image detection module. The first bounding box enables the object tracker to initialize its object tracking modules and commence object detection and tracking. For example, at 306, the EDF module 140 initializes its decision trees based on the bounding box. A detailed explanation of EDF decision trees will be provided in later discussions of following figures.

At 308, the EDF and/or CT modules 140, 150 of the object tracker commence scanning for object images in each frame of image data, until an image is detected. At 310, one or more bounding boxes are outputted by either or both of the EDF or CT module—depending on which module detects the object. These bounding boxes are provided to the synthesis module 160, which uses the online learning dataset 180 to determine if a final bounding box should be generated at 312. If the synthesis module 160 determines that a final bounding box should not be generated, the object tracker returns to 308. Otherwise, the synthesis module 160 performs bounding box synthesis and outputs a final bounding box at 314. The final bounding box may be provided to the OFT module 130 so that the OFT may commence tracking during a next frame. Subsequently, at 316, the online hierarchy learning module 122 updates the online learning dataset based on the locations of the previous EDF and/or CT bounding box(es) relative to the final bounding box. At 318, the object tracker tracks the object in a new frame using the OFT module, EDF module, and the CT module. When either of these modules tracks the object, it outputs a bounding box to synthesis module 160.

At 320, if a an OFT, EDF or CT bounding box is provided to the synthesis module 160, the synthesis module uses information in the online learning dataset to determine if a final bounding box should be generated. If the synthesis module 160 determines that a final bounding box should not be generated, operations of the object tracker return to 318. Otherwise, at 322, the synthesis module 160 synthesizes the received bounding boxes using information in the online learning dataset and provides a final bounding box based on the synthesis. The final bounding box may be provided to OFT module 130 to enable OFT tracking of the object in a subsequent frame. At 324, the online hierarchy learning module 122 updates the online learning dataset based on the final bounding box location. Subsequently, tracking may occur in additional frames by re-execution of the processes depicted at 318-324

The OFT module 130 of the present disclosure may employ the Lucas-Kanade optical flow algorithm to provide an OFT bounding box for a current frame. The Lucas-Kanade algorithm makes predictions about the optical flow of an object appearing in a previous frame of image data by using the least squares criterion to solve the basic optical flow equations for pixels near the center of image. When presented with a frame x of image data, the Lucas-Kanade algorithm analyzes a previous bounding box from frame x−1 and determines the tracking status and forwards and backwards motion vectors of certain pixels inside the bounding box. Then, the reliable points are used to predict a new OFT bounding box for frame x. Because the OFT module requires a bounding box from a previous frame in order to determine a bounding box for a currently analyzed frame, the OFT module 130 is not capable of providing an initial bounding box for a tracked object. Thus, in accordance with the present disclosure, the OFT module is not used to analyze frames of image data to track an object unless the EDF or CT module has provided a bounding box associated with the object in one or more previous frames.

However, in accordance with this disclosure, when the OFT module 130 is used to analyze a frame, the OFT module may be configured to analyze the frame before the EDF module 140 commences its frame analysis. When such an arrangement is used, the OFT 130 may provide the EDF module 140 with most recent OFT moving direction information for any objects being tracked. This information may be used by the EDF module 140 to enable efficiency improvements within the EDF. As will be explained in greater detail in the following description of the EDF module 140, the EDF algorithm may be computationally intensive. Scheduling OFT module 130 frame analysis to occur prior to the EDF module 140 analysis enables moving direction information to be provided to the EDF module 140 so that the EDF 140 may focus its processing on portions of the frame most likely to contain an image of a tracked object.

Figure 4:
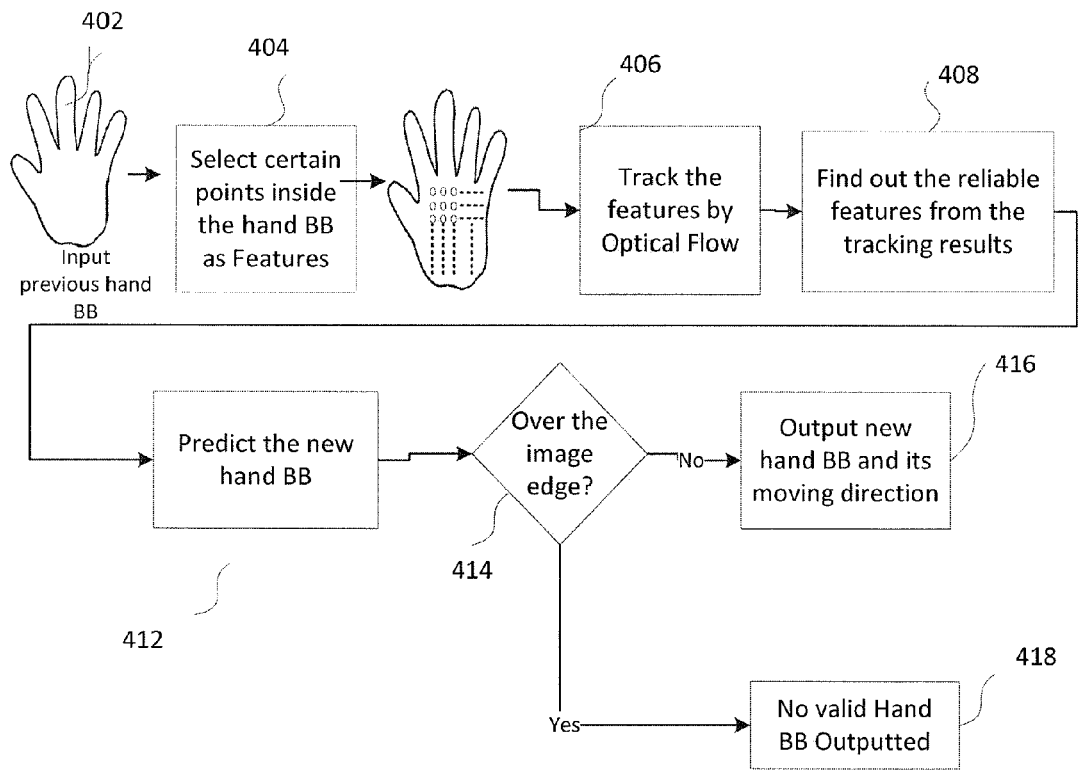
FIG. 4 is a flow diagram depicting example operations of an optical flow module in accordance with the present disclosure.

FIG. 4 is a flow chart depicting example operations of the OFT module 130 in the tracking of a hand. The processes depicted in FIG. 4 are for explanatory purposes only. The depicted sequence of processes represents only one of the many available and recognizable sequences and combinations of interchangeable processes and methods which are described and covered by this disclosure. Additionally, although the OFT module 130 of FIG. 3 employs the Lukas-Kanade (LK) algorithm, other optical flow algorithmic variations may also be employed by the OFT.

At 402, the OFT module 130 accesses a previous bounding box associated with an image of the hand in the previous frame. The previous bounding box may be provided directly to the OFT module 130 upon being outputted, or may be stored in memory 106 and subsequently accessed by the OFT module 130. In certain embodiments, the previous frame bounding box may be a previous final bounding box outputted by the synthesis module 160. Alternatively, in certain embodiments, the OFT may be provided with a previous OFT, EDF or CT module bounding box. At 404, the OFT module 130 selects certain central points inside the previous bounding box as features. These points are depicted by the circles near the center of the hand seen at 406. At 408, the OFT module 130 tracks the features. Tracking of the features may be done, for example, by using Lucas-Kanade optical flow bi-directionality. At 410, the OFT module 130 ascertains the reliable features from the tracking results.

Subsequently, at 412, the OFT module predicts a new OFT bounding box for the hand in the current frame. At 414, the OFT module determines whether the newly predicted bounding box overlaps or is beyond the edge of the image. If the bounding box is at or beyond the edge, the OFT module does not output a bounding box for the current frame. However, if the bounding box is entirely within the image, the OFT module outputs the newly estimated bounding box for the current frame, as well as the moving direction of the bounding box. The outputted OFT bounding box is recorded in memory 106 and provided to the synthesis module. As will be explained in greater detail in later paragraphs, the synthesis module uses the online learning dataset library to compute a confidence metric for the OFT bounding box and to determine how to synthesize the OFT and/or CT bounding boxes.

Although not depicted in FIG. 3, the OFT module 130 may be configured to perform computations in an efficient manner when multiple objects are being tracked. For example, the OFT module 130 may identify general processes or computations which are necessary for the flow tracking of each object, but which are not unique or specific to either of the objects being tracked. The OFT module 130 may also identify more specific processes or steps which are needed for the tracking of only one of the tracked objects, and which are not involved in the tracking of both objects. By identifying and categorizing processes and steps in this way, the OFT module may use pyramid building to share processing and data amongst the multiple objects (for processing) used to track the objects appearing in a frame of image data. In this way, the OFT module may avoid redundant computations and operate using fewer processing resources.

The CT module 150 may employ color tracking processing techniques commonly recognized in the art of image tracking. In accordance with the present disclosure, use of the CT module may be limited or restricted to certain situations because color tracking techniques are vulnerable to false positive object detection and tracking. Accordingly, the synthesis module 160 may be configured to only accept a CT bounding box for a frame which does not trigger an OFT or EDF bounding box. Moreover, the synthesis module 160 may be configured to accept CT bounding boxes only for a limited number of consecutive frames in order to prevent substantial tracking degradation from being caused by several consecutive false positive bounding boxes. The CT module 150 of the present disclosure may be a part of the same processor 110 as the other tracking modules 130, 140. Alternatively, it may be embodied in a graphics processor unit (GPU).

The EDF module 140 employs a powerful machine-learning algorithm for classification and regression to find an image of the tracked object in a frame of data and output an EDF bounding box corresponding to the location of the image. The EDF module 140 uses the algorithm to model the appearance of the tracked object in a manner which is resistant to changes in object shape. Furthermore, when analyzing a current frame of image data, the EDF algorithm is capable of using a bounding box from a previous frame and estimated moving direction of the tracked object to more efficiently process image data in the current frame.

In one embodiment of this disclosure, an EDF module 140 may be configured with the capability of outputting one or more bounding boxes following its analysis of a frame of image data. The number of EDF bounding boxes may be determined by the analytical results obtained by individually analyzing windows of the frame. For example, in the case of a frame in which a tracked object is detected in multiple disparate windows, the EDF bounding box may, under certain circumstances, output more than one bounding box. Similarly, for frames in which a tracked object is detected only in one window or in several windows clustered closely together, the EDF module may output one bounding box.

In another embodiment, the EDF module 140 may be configured to refrain from providing bounding box outputs when independent analyses of the various windows of a frame reveal an image of the tracked object to be present at non-overlapping windows dispersed throughout the frame, or in windows which are separated more than a threshold amount from each other. When this feature is employed in an EDF module 140, the module may also be configured to select only one bounding box (a "best" bounding box) for frames in which the image is determined to be present in multiple windows without the threshold being exceeded.

The EDF module 140 calculates tracking information by individually analyzing numerous delineated areas of a frame. Each of the areas of the frame overlaps other neighboring delineated frame areas analyzed by the EDF module 140. Because of this overlap, each of these frame areas may be thought of as "sliding windows". However, for simplicity, such frame areas will be referred to hereinafter as "windows".

Figure 5:
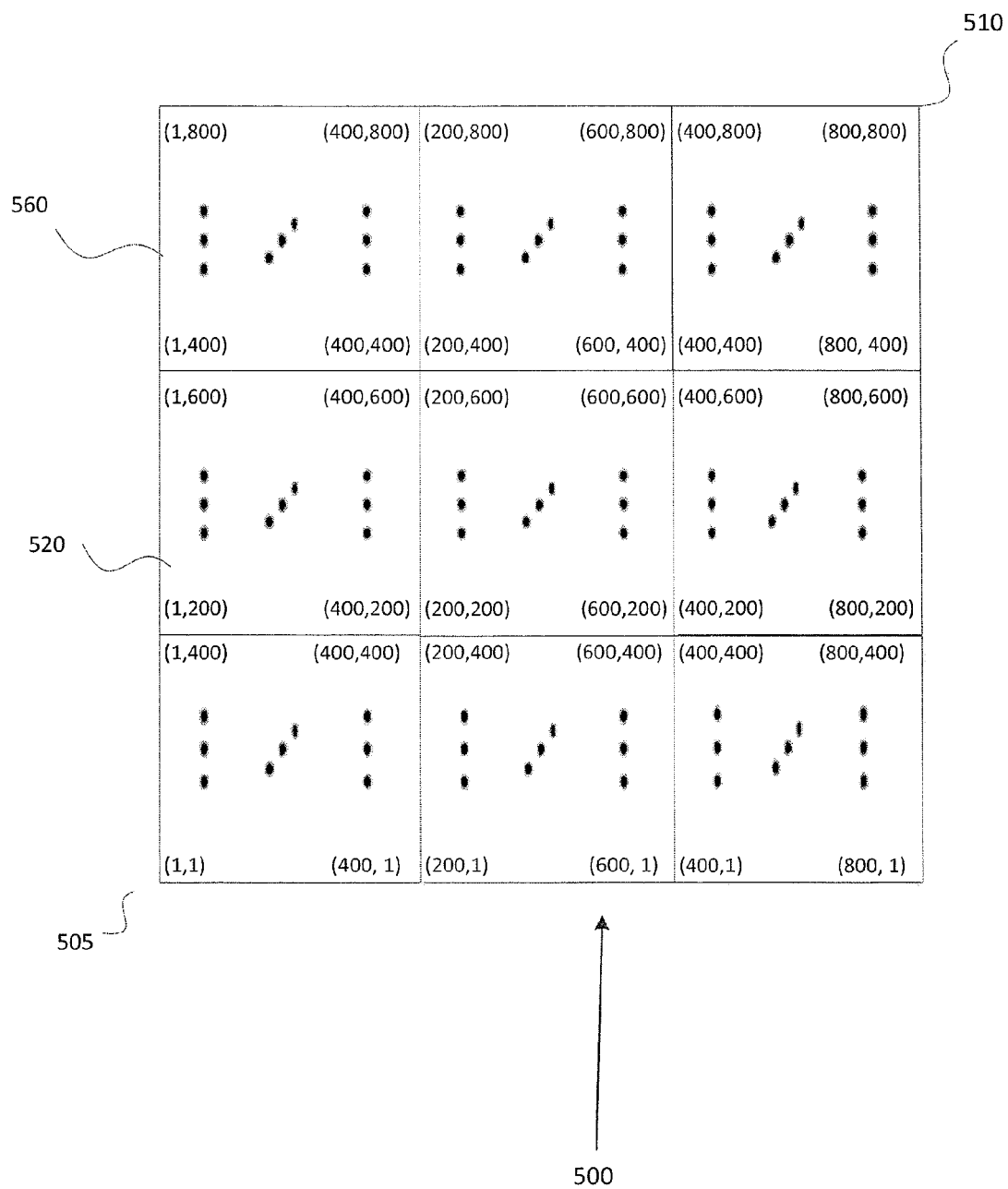
FIG. 5 is a diagram depicting a frame of image data, and delineations of overlapping windows defined by pixel location, in accordance with the present disclosure.

FIG. 5 shows an example frame divided into windows for EDF tracking analysis. The frame 500 of FIG. 2 is simplified for explanatory purposes. For example, frame 500 is depicted as consisting of 9 windows. In actual implementations, frames analyzed by the EDF module may involve many more windows. Each window of the frame is depicted as a square window encompassing 160,000 pixels. However, in accordance with this disclosure, windows of a frame may have any size and shape, and may contain any number of pixels.

For convenience and explanatory purposes, this disclosure will hereinafter rely on the pixel location/identification convention depicted in FIG. 2, whereby each pixel is identified by its location at a Cartesian (x,y or horizontal, vertical) coordinate of a grid system mapped to the frame. For example, the pixel at the extreme lower left corner 505 of a square frame 500 may be identified by the coordinate 1,1.

Furthermore, for a square frame containing 640,000 pixels, such as frame 500, the pixel at the extreme upper right corner 510 of the frame 500 may be identified as the pixel at 800,800. Although this reference will describe processing steps with reference to the aforementioned Cartesian coordinate system, an object tracker in accordance with this disclosure may use any reference system to depict locations, identify pixels, boundaries, vectors and the like. An object tracker may also use any such alternative means of reference in any processing steps without being in any way limited to a Cartesian reference system.

FIG. 5 uses the aforementioned Cartesian coordinate convention to depict the pixel locations at each window corner. In FIG. 5, the overlap of each window with neighboring windows is depicted by the redundant Cartesian coordinates at the window corners. For example, the window at 520 is depicted as having uppermost pixels with y-coordinate equal to 600. Also, the window at 560, which is immediately above the window 520, has lowermost pixels with y-coordinate equal to 400. Thus, where windows 520 and 560 overlap, these two windows have 400×200=80,000 pixels in common. Because the depicted Cartesian coordinates of FIG. 5 depict the overlap of windows in frame 500, the fact that the square shapes in FIG. 5 do not themselves overlap is not meant to be understood as representing that the windows represented thereby do not overlap.

The overlapping nature of the frames used by the EDF module 140 may enable more accurate tracking results to be obtained. However, the overlapping of frames implies that more frames must be analyzed, as compared to an algorithm using similarly sized frames without overlap. Thus, the benefits of frame overlap may come at the expense of increased EDF computations per frame. These computational requirements, if not effectively managed, can make the EDF algorithm unsuitable for frames with high pixel density.

In accordance with this disclosure, the EDF module 140 may incorporate any combination of several learning features described in later paragraphs herein. Each of these learning features may enable the EDF to reduce computations by refraining from analyzing windows unlikely to have the image contained therein. Additionally, the object tracker 100 may also incorporate additional efficiency-enhancing features for use in other of the modules within processor 110. For example, certain additional features will be discussed herein which enable more efficient processing by the synthesis module 160 and the OFT module 140, thereby enabling processor resources to be freed for use by the EDF module 140.

Figure 6:
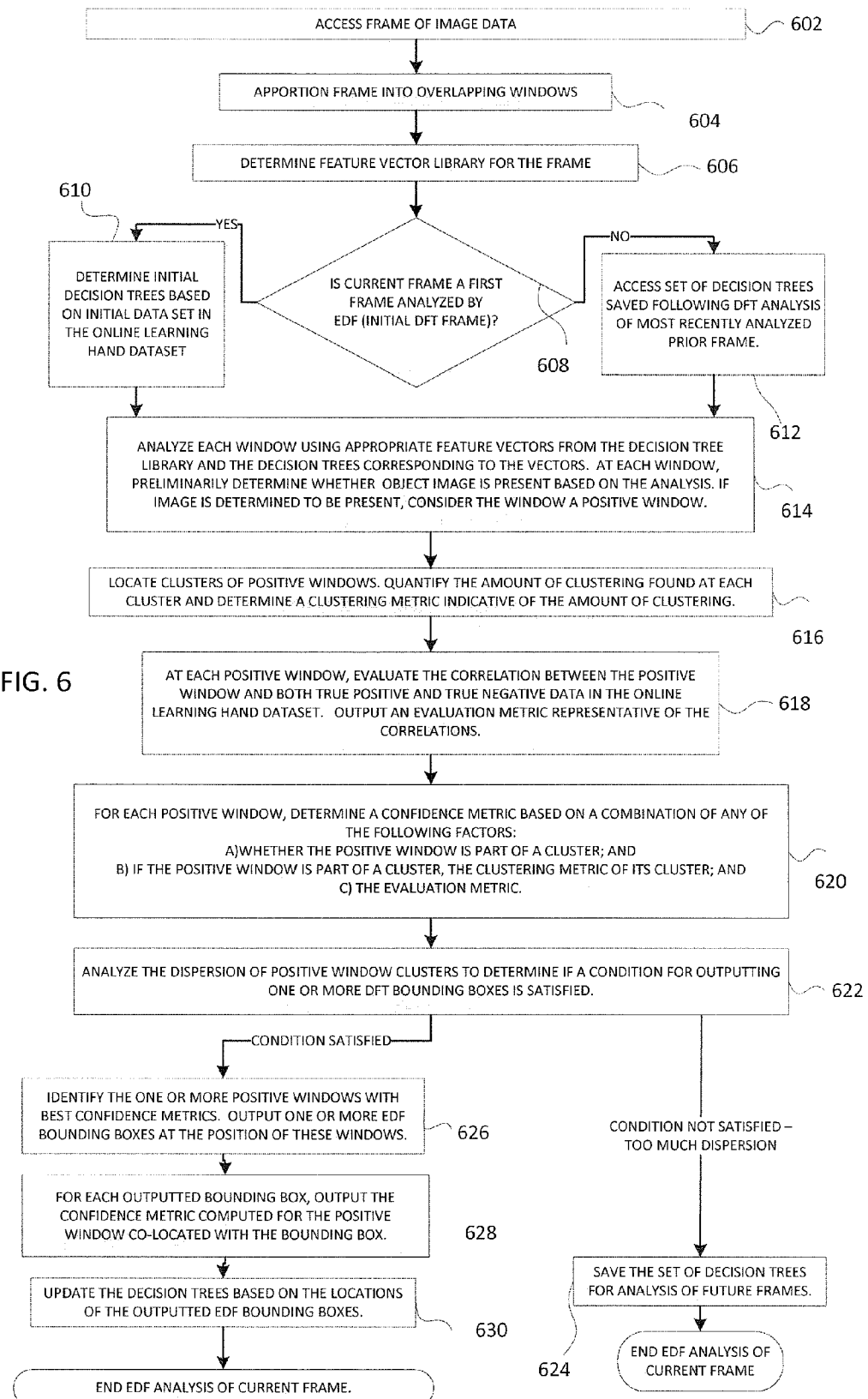
FIG. 6 is a generalized flow diagram depicting an example of processes which may be used by an enhanced decision forest tracking module of the present disclosure.

FIG. 6 is a generalized flow diagram depicting an overview of a process which the EDF module 140 may use to analyze an image data frame in order to track one or more objects. Certain sub-processes, computations and features described in FIG. 6 will be described in greater detail with reference to later figures. The processes depicted in FIG. 6 are for explanatory purposes only and are not intended to limit the scope of this disclosure. The depicted processes and process sequences represent only some of the many interchangeable sequences and combinations of processes and methods which are described and covered herein, and which will be readily apparent to one of ordinary skill in the art.

As shown in FIG. 6 at 602, EDF analysis of a frame may be started by the EDF module 140 accessing the frame of image data to be analyzed. At 604, the EDF module 140 may apportion the frame into overlapping windows. At 606, the EDF module 140 may determine feature vectors for the frame and store the feature vectors in a feature vector library. An explanation of feature vectors and an example process for determining them will be provided in later paragraphs, with reference to FIGS. 7-8.

At 608, the EDF module 140 determines if the current frame being analyzed is a first frame being subject to EDF analysis (an "initial EDF frame"). If the frame is an initial EDF frame, the EDF module 140 determines initial decision trees based on the initial dataset stored in the online learning dataset, as depicted at 610. The process of determining initial decision trees is part of a larger process that will be referred to hereinafter as the EDF algorithm "initial learning phase".

At 612, if the current frame being analyzed is not an initial EDF frame, the EDF module 140 accesses decision trees that were saved following EDF analysis of the most recently analyzed prior frame.

After determining initial decision trees at 610 or accessing decision trees at 612, the EDF module 140 separately analyzes each window of the frame at 614. Analysis of a window may include utilizing certain of the accessed or determined feature vectors which correspond to the window, as well as those decision trees which correspond to a utilized feature vector. Analysis of windows using feature vectors and decision trees, as well as a detailed explanation of decision trees will be provided later with reference to FIGS. 7 and 8. Also at 614, based on the separate analyses of the windows, the EDF module 140 may make preliminary determinations whether an image of the tracked object is present within each individual window. Each window which is preliminarily determined to have an image of the tracked object is considered as a positive window.

Subsequently, at 616, the EDF module 140 locates clusters of positive windows. A cluster of positive windows may be a group of positive windows, whereby each positive window of the group overlaps at least a minimum number of other positive windows. Alternatively, a cluster may be a group of positive windows in proximity to each other, as defined by any other definition which may be conceived of by one skilled in the relevant art. Furthermore, at 616, the EDF module 140 quantifies the amounts of clustering at the various clusters and determines clustering metrics indicative of the amount of clustering. EDF module 140 may assign a clustering metric to a cluster based on its size, number of positive windows, density, number of overlapping positive windows, average amount of positive window overlap, average positive window displacement from a cluster center, or using other methodology.

At 618, the EDF module 140 evaluates each positive window using data in the online learning dataset 180. Each evaluation is conducted to determine if the data in the online learning dataset 180 validates the preliminary determination that an image of a tracked object is within the positive window being analyzed. An evaluation may involve the EDF module 140 quantifying the similarity between image data in a positive window and information in the template true positive library 188 or true negative library 189. For example, within a positive window, the EDF module 140 may determine the most prominent features (shapes, luminances, feature sizes, and/or occlusions, etc.) detected amongst the pixels of the positive window. The EDF module 140 may compare these prominent features with information stored in the template true positive library 188 and template true negative library 189 of the online learning dataset 180.

Additionally or alternatively, the evaluation at 618 may involve comparing the position of true positive windows to the window or bounding box positions stored in the EDF true positive library 186 or EDF true negative library 184. If data in the online learning dataset 180 does not validate the preliminary determination associated with an evaluated positive window, a false positive detection of an object is implied. If the online learning dataset does validate the positive window, a true positive detection is implied. For each positive window evaluated at 618, an evaluation metric is outputted to indicate how strong the implication of accuracy or error is.

At 620, the EDF module 140 determines a unique confidence metric for each positive window. A confidence metric for a positive window may be based on a combination or single one of any of the following factors: a) whether the positive window is part of a cluster; b) if the positive window is part of a cluster, the clustering metric of its cluster; and c) the evaluation metric of the positive window.

At 622, the EDF module 140 analyzes the dispersion of the positive window clusters to determine if a condition for outputting one or more EDF bounding boxes is satisfied. This determination may be performed in order to prevent the EDF from outputting a bounding box when analysis of a frame's image data results in conflicting conclusions. The determination may involve referencing a dispersion threshold and determining that the condition is satisfied when the dispersion of positive windows is less than the threshold. Dispersion may be defined and determined using any number of methods known in the art. One example method to calculate dispersion is to calculate standard deviations in frame position. However, this disclosure shall be understood to include any additional methods for calculating dispersion which may be recognizable to one skilled in the art.

If the condition for outputting one or more bounding boxes is not satisfied, the EDF module 140 saves the set of decision trees for analysis of future frames, as described at 624. However, if the condition is satisfied, the EDF module ranks the positive windows based on confidence metrics at 626, and selects one or more highest ranked positive windows (i.e. windows with best confidence metrics). The EDF module 140 outputs a bounding box to the synthesis module for each selected positive window. Each EDF bonding box depicts the location of the positive window to which it corresponds. Also, at 628, the EDF module 140 may output confidence metrics for one or more of the outputted EDF bounding boxes. A confidence metric for an EDF bounding box is the previously computed confidence metric of the positive window to which the bounding box corresponds.

At 630, the EDF module 140 individually updates the decision trees most recently used, at 614, to analyze windows of the frame. To individually update a decision tree, the EDF module 140 determines the window that the tree was used to analyze, and modifies the tree based on the proximity of the window to one or more of the most recently outputted EDF bounding boxes. The modified decision trees are then saved for future EDF analysis of subsequent frames.

Figure 7:
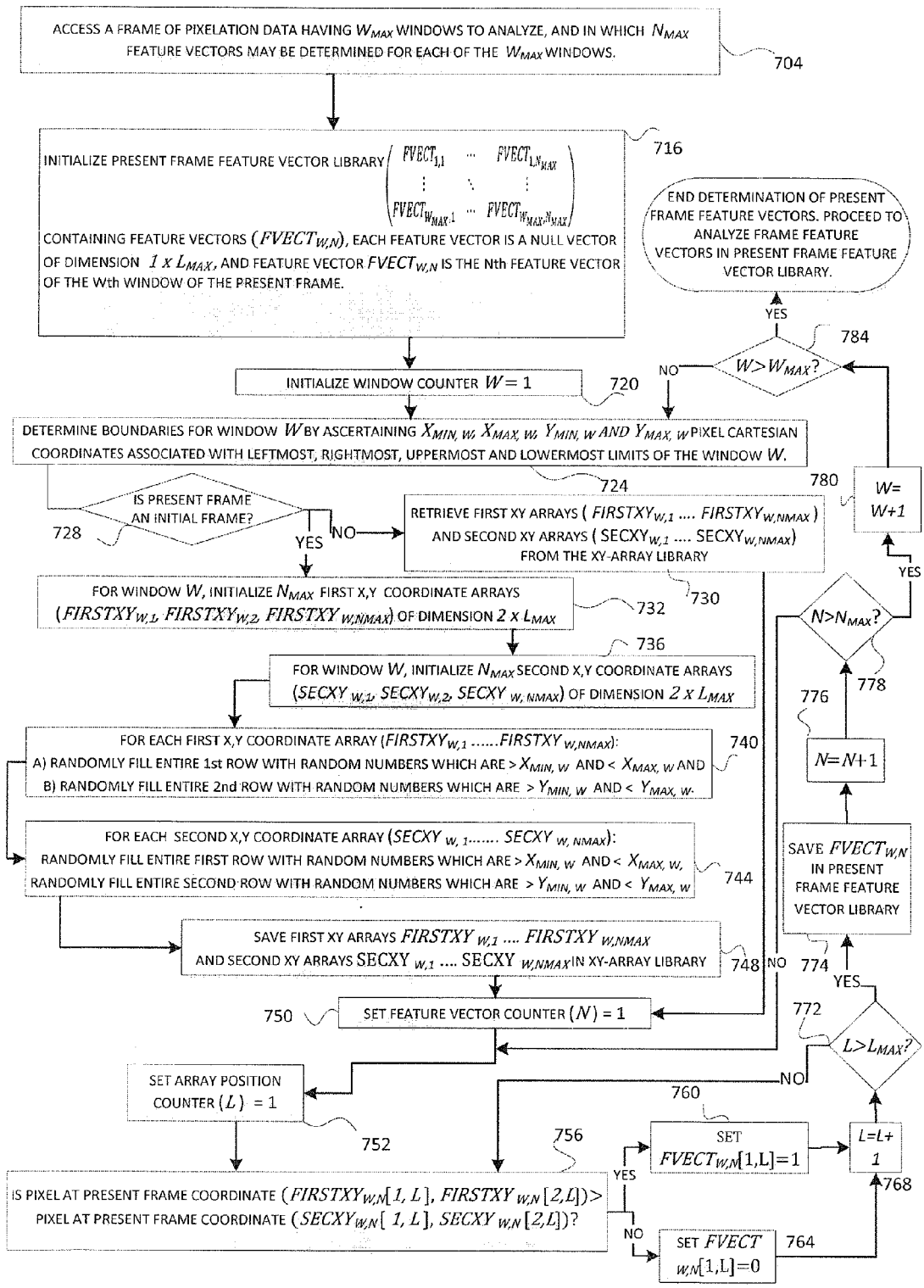
FIG. 7 is a generalized flow diagram depicting example sub-processes which may be used for object tracking by an enhanced decision forest tracking module of the present disclosure.
Figure 8:
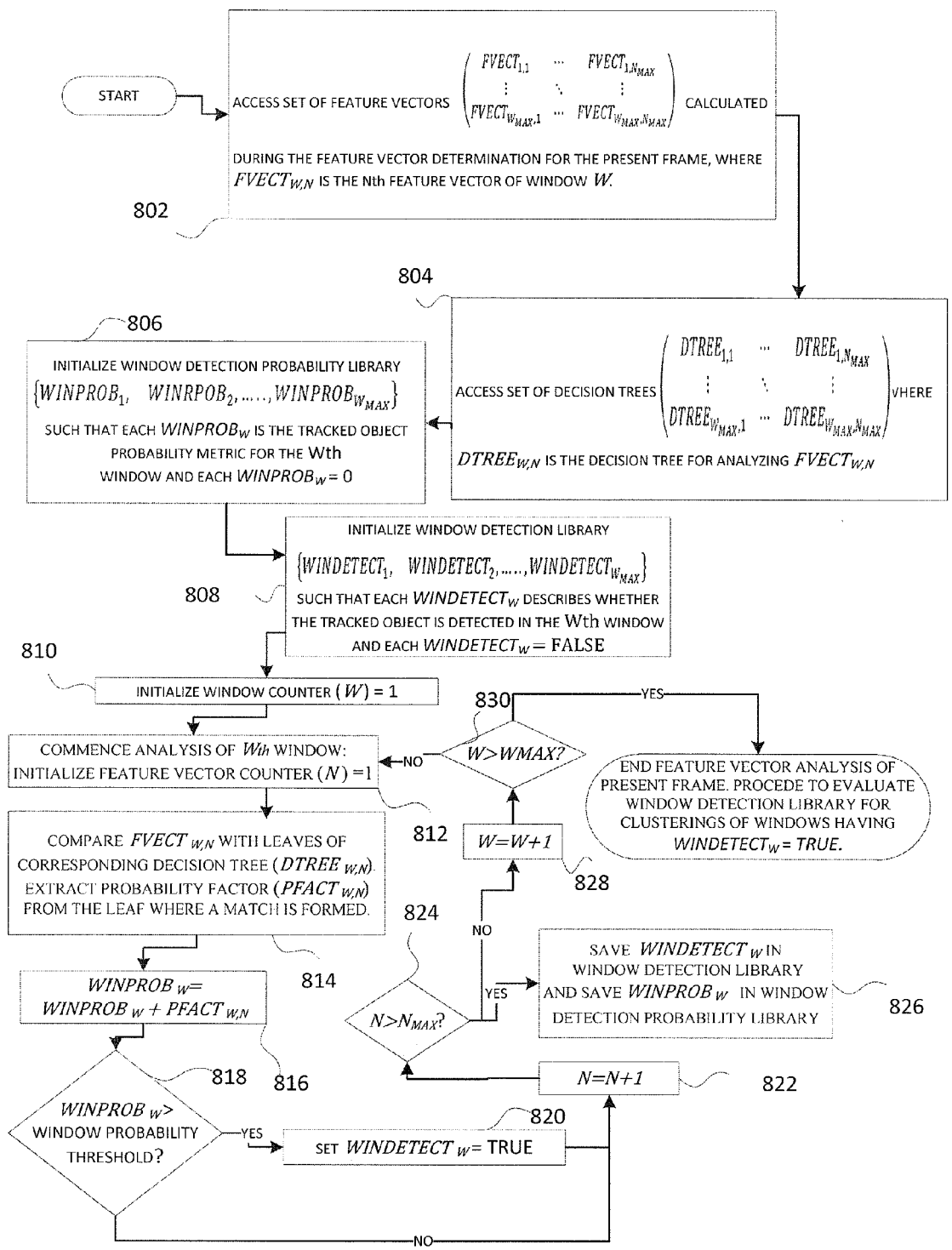
FIG. 8 is a generalized flow diagram depicting example computational sub-processes which may be used for object tracking by an enhanced decision forest tracking module of the present disclosure.

FIGS. 7 and 8 depict example sub-processes associated with the operation of the EDF module 140. FIG. 7 depicts an example process for use in determining feature vectors for any frame being analyzed by the EDF module 140. FIGS. 7 and 8 and the methods and algorithms disclosed therein are exemplary only. For example, in accordance with this disclosure, a decision forest tracker may determine feature vectors using any alternative method suitable for decision forest image detection and object tracking.

The process of determining feature vectors was previously mentioned with regards block 606 of FIG. 6. The procedures of FIG. 7 may be utilized whether the frame being analyzed is a first frame being analyzed by the EDF ("initial frame"), or a later frame preceded by one or more frames previously analyzed by the EDF module 140. As depicted in FIG. 7, in analyzing a frame, the EDF module 140 individually analyzes each frame window by obtaining multiple feature vectors corresponding to the analyzed window. Here, a feature vector can be thought of as an n-tuple consisting of n binary values. Within each feature vector, each of the n binary values indicates the result of a unique comparison of two pixels located within the window.

In analyzing a window of an initial frame, the EDF module 140 may randomly select the locations of the pixels that are compared to form the feature vectors of the window. Alternatively, the locations may be chosen based on a geometric pattern, or chosen such that the chosen pixels include are evenly distributed throughout the window. However, in analyzing the same window in subsequent frames, the EDF module 140 may reuse the pixel locations selected for determining the feature vectors of the window in the initial frame. In analyzing subsequent frames using this methodology, the most recent values of pixels at these reused locations are compared, and a new feature vector library is generated based on the reused feature vector locational definitions.

As depicted, at 704, the process of determining feature vectors for an analyzed frame involves accessing the frame. As mentioned at 704, in FIG. 7 and beyond, $W_{MAX}$ shall be understood to refer to the number of windows to be analyzed in the frame, and $N_{MAX}$ shall be understood to refer to the number of feature vectors to be determined for each window in the frame. At 716, a feature vector library is initialized. The feature vector library contains $N_{MAX}W_{MAX}$ null feature vectors, each having dimensions of $1 \times L_{MAX}$.

At 720, a window counter W is initialized and set to 1. At 724, the EDF module determines boundaries for window W by ascertaining $X_{MIN, w}$, $X_{MAX, w}$, $Y_{MIN, w}$ and $Y_{MAX, w}$ pixel Cartesian coordinates associated with leftmost, rightmost, uppermost and lowermost limits of the window W. At 728, the EDF module 140 determines whether the presently analyzed frame is an initial frame. If the present frame is an initial frame, the EDF module 140 advances to 728 and retrieves the first and second x,y arrays from the x-y array library. Although not yet described, the first and second x,y arrays and the x-y array library will be described in detail in explanations of 732-744, which occur only when the present frame is an initial frame. In cases in which a presently analyzed frame is not an initial frame and the EDF module advances to 728, the model then advances to 748 after retrieving the first and second x-y arrays. Thus, in this case, the EDF module bypasses the procedures shown at 732-744, since these procedures are unnecessary when the present frame is not an initial frame.

Conversely, if the present frame, as analyzed at 728, is not an initial frame, the EDF module 140 proceeds instead to 732 and 736. At 732 and 736, the EDF module 140 initializes $W_{MAX}$ first x,y coordinate arrays for the $W_{th}$ window. The EDF module also initializes $W_{MAX}$ second x,y coordinate arrays for the $W_{th}$ window, at 736. Each of the first and second x, y coordinate arrays are of dimension $2 \times L_{MAX}$.

Subsequently, at 740 the EDF module 140 fills each of the first x,y coordinate arrays with random numbers. The random numbers are chosen such that the numbers in the first column are both greater than $X_{MIN}$ and less than $X_{MAX}$, and such that the numbers in the second column are both greater than $Y_{MIN}$ and less than $Y_{MAX}$.

At 744, the EDF module 140 fills each of the second x,y coordinate arrays using the same technique as described above with regards to filling the first x,y coordinate arrays. By being filled in this manner, each first and second x-y array contains a collection of random pixel locations (depicted by x,y coordinates within the frame) within the window to which it corresponds. At 748, the first and second x,y coordinate arrays are saved in an x,y-array library.

At 750, a feature vector counter (N) is initialized to 1. At 752, an array position counter (L) is set to 1. Next, at 756, a comparison of pixels at two different locations within the $W_{th}$ window is performed. The comparison operation determines whether the pixel at the x,y cartesian coordinate $FIRSTXY_{W,N}[1,L]$, $FIRSTXY_{W,N}[2,L]$ of the present frame is greater than the pixel at the x,y Cartesian coordinate $SECXY_{W,N}[1, L]$, $SECXY_{W,N}[2,L]$ of the present frame. Based on the result of the comparison, at 564 or 560, a "1" or "0" is saved in the $L_{th}$ column of feature vector $FVECT_{W,N}$. At 768, array position counter L is increased by 1. At 772, counter L is compared to $L_{MAX}$. If L is greater than $L_{MAX}$, the process returns to 766, where the comparison described in that block is again executed—this time using the newly incremented value of L. However, if, at 768, L is greater than $L_{MAX}$, then the determination of feature vector $FVECT_{W,N}$ is complete and the vector is saved in the feature vector library for the present frame.

After saving feature vector $FVECT_{W,N}$ in the feature vector library, counter N is incremented at 776. The new value of N is compared to $N_{MAX}$ at 778. If N is less than $N_{MAX}$, the EDF module 140 returns to 752, now with a new value of N.

If N is greater than $N_{MAX}$ at 778, each feature vector in the Wth window is now determined. Thus, at 780, the EDF module 140 increments the window counter so that feature vectors for a next window may be determined if there are remaining windows without determined feature vectors. Next, at 784, the EDF module 140 determines whether window counter W is greater than $W_{MAX}$. If W is not yet greater than $W_{MAX}$, there is at least one remaining window of the frame which lacks determined feature vectors. Thus, in this case, EDF module 140 returns to 724 with the recently incremented window counter W, so that feature vectors for the Wth window may be subsequently determined.

W being in excess of $W_{MAX}$ indicates that a complete set of $N_{MAX}$ decision tree vectors has been obtained for each of the $W_{MAX}$ windows in the currently analyzed frame. Thus, at 784, if W is greater than $W_{MAX}$, the determination of feature vectors for the present frame is ended.

When the EDF module 140 has determined feature vectors for each of the windows of a frame being analyzed, the module proceeds to analyze the windows individually in order to identify windows containing an image of the tracked object. In this process, analyzing an individual window involves individually analyzing the feature vectors of the window. Each analysis of a feature vector yields a probability factor which affects whether the window is identified as containing an image of the tracked object.

The EDF module 140 may individually analyze the feature vectors of a window by applying a unique decision tree to each feature vector. A decision tree may be structured such that each leaf of the decision tree corresponds to a different n-tuple containing binary elements. Each leaf also indicates a probability factor which may be used in ultimately determining a final estimate as to whether the window is associated with an image of the object.

Applying a decision tree to a feature vector involves identifying a decision tree leaf having a corresponding n-tuple which matches the feature vector. The probability factor indicated by the matching leaf is summed with other probability factors. These other probability factors are those yielded by applying a unique tree to each of the other feature vectors of the analyzed window. At an analyzed window (window W), the total sum of probability factors (hereinafter referred to as the window probability metric $\text{WINPROB}_w$) is compared to a threshold to yield a yes/no determination as to whether the window is associated with an image of a tracked object. The window probability metric is saved in a window detection probability library which holds a metric for every one of the windows of the frame. Additionally, the yes/no result of the determination is saved in a window detection library which holds the yes/no results for every one of the windows of the frame.

In analyzing an initial frame, the EDF module 140 may initialize the probability factors of the various decision trees based on the position of an initialization bounding box calculated by an object image recognition or tracking module operating externally from the multiple object tracker. The leaves of decision trees which correspond to windows which are removed from the initialization bounding box may be assigned initial probability factors which are lower than those of decision trees of windows which overlap the initialization bounding box.

After the EDF module 140 completes its tracking analysis of a frame, it modifies the decision trees most recently used to analyze the feature vectors of the frame, provided that the OFT module 130 has outputted a bounding box for the same frame, and the synthesis module 160 has evaluated the OFT bounding box with high confidence. In this case, probability factors are decreased at decision trees used to analyze feature vectors of windows removed from the final box. Also, probability factors are increased at decision trees used to analyze feature vectors of windows overlapping the final bounding box.

In accordance with one example method for modifying the decision trees, the decision trees are modified by increasing or decreasing only the probability factors at leaves where a feature vector match was most recently formed. In this way, only one leaf per decision tree is modified. At a leaf being modified, the probability factor may be increased if the decision tree is associated with a window which overlapped a recently outputted EDF bounding box. The probability factor may be decreased if the decision tree is associated with a window which did not overlap a most recently outputted EDF bounding box.

Following decision tree modification, the decision trees are retained for analyzing a next future frame. In each frame, each decision tree is applied to analyze a feature vector occupying a same feature vector library index (W, N) position.

FIG. 8 depicts the use of decision trees by the EDF module 140 in analyzing frame windows after the determination of a frame feature vector library depicted in FIG. 5. The processes depicted in FIG. 8 are for explanatory purposes only and represent only one of the many available sequences and combinations of interchangeable processes and methods which are described and covered by this disclosure.

As shown, at 802 the EDF module 140 accesses the set of feature vectors previously determined using the algorithm of FIG. 7. At 804, the EDF module accesses the set of decision trees. The set of decision trees may consist of up to $w_{MAX} \times N_{MAX}$ decision trees, and may be configured such that $\text{DTREE}_{W,N}$ is the decision tree used to analyze $\text{FVECT}_{W,N}$. In some embodiments, less trees are used; for example, when trees are overlapped, $N_{MAX}$ trees may be used in some embodiments. If the frame is the first frame subject to EDF module 140 analysis, accessing the set of decision trees at 804 may involve initializing the decision tree probability factors based on the initial data set stored in the online learning dataset 180. However, if previous frames have been analyzed by the EDF module 140, accessing the set of decision trees involves accessing the modified decision trees stored following the most recent EDF frame analysis.

At 806, the EDF module 140 initializes a window probability detection library which holds a probability metric for each of the $N_{MAX}$ windows of the frame. Each probability metric in the detection library is initialized to zero. At 808, the EDF module 140 initializes a window detection library which holds a true/false indication ($\text{WINDETECT}_W$) for each of the $N_{MAX}$ windows. Each true/false indication (WINDETECT) is initialized to "false". At 810, a window counter (W) is initialized to 1. At 812, the EDF module 140 commences analysis of the $W_{th}$ frame by initializing a feature vector counter (N) to 1. Subsequently, at 814, the EDF module 140 compares $\text{FVECT}_{W,N}$ with leaves of its corresponding decision tree ($\text{DTREE}_{W,N}$). The EDF module 140 extracts probability factor ($\text{PFACT}_{W,N}$) from the leaf where a match is formed. Then, at 816, window probability metric $\text{WINPROB}_w$ is increased by $\text{PFACT}_{W,N}$. At 818, the EDF module 140 determines if $\text{WINPROB}_w$ is greater than a predefined window probability threshold. If an affirmative determination results, then $\text{WINDETECT}_w$ is set to "true" at 820, thereby recording a preliminary determination that an image of the tracked object exists within the Wth frame. If a negative determination results at 818, the EDF module skips the box at 820.

In either case, the algorithm increments feature vector counter (N) at 822, and then determines if N exceeds $N_{MAX}$ at 824. If a negative determination is made at 824, the EDF module 140 returns to 814 with the now updated value of feature vector counter (N), and proceeds to execute 814-824 in the manner previously described.

During any iteration, if N is determined to be in excess of $N_{MAX}$ at 824, the analysis of every feature vector in window W is indicated as having been completed. Accordingly, the EDF module 140 saves $\text{WINDETECT}_w$ in the window detection library and saves $\text{WINPROB}_w$ in the window detection probability library, as depicted at 826. At 828, the EDF module 140 increments window counter W to enable the feature vectors of a next window to be analyzed. At 830, the EDF module 140 determines if W exceeds $W_{MAX}$. If a negative determination results, the EDF module 140 returns to 812 to commence analysis of the $W_{th}$ window. However, if a positive determination is made at 830, the individual analysis of windows using the feature vector library is complete. The window detection library and the window detection probability library are available in memory 106 for the additional EDF processing needed to determine if one or more bounding boxes will be outputted, and to define the locations of any bounding boxes which will be outputted.

As described previously, the EDF module 140 may perform object tracking by using feature vectors to individually analyze each window of a frame, as described in FIGS. 4, 5 and 6. However, individually analyzing every window of a frame may require a large amount of computations, especially if window overlap is substantial. For this reason, the EDF module 140 may be designed to perform location based scanning. In location based scanning, the EDF module 140 analyzes only certain windows determined to have a highest likelihood of containing an image of a tracked object. The EDF module 140 may identify the highest likelihood windows based on the location of a final bounding box outputted by synthesis module 160 following analysis of a most recent frame. For example, if a single final bounding box for a most recent frame was positioned in the center of the frame, the EDF module 140 may analyze only windows located at or near the center of the currently analyzed frame. In this case, the processes described with regards to FIGS. 4, 5 and 6 will generally be the same except for the smaller number of windows being analyzed.

Also, in accordance with this disclosure, the EDF module 140 may be configured to obtain moving direction information from the OFT module 130 so that the EDF may perform direction-based scanning of windows. Moving direction information may provide an indication where a tracked object will be located in a present frame, relative to the final bounding box determined for the previous frame. Using this information, the EDF module 140 may identify a cluster of windows displaced from the previous bounding box in the moving direction indicated by the OFT module. Instead of analyzing only windows located at or near the previous frame final bounding box, the EDF module may analyze frames in the displaced cluster. This technique may enable the EDF module to better direct its analysis in light of the most recent information calculated by the OFT module.

Figure 9:
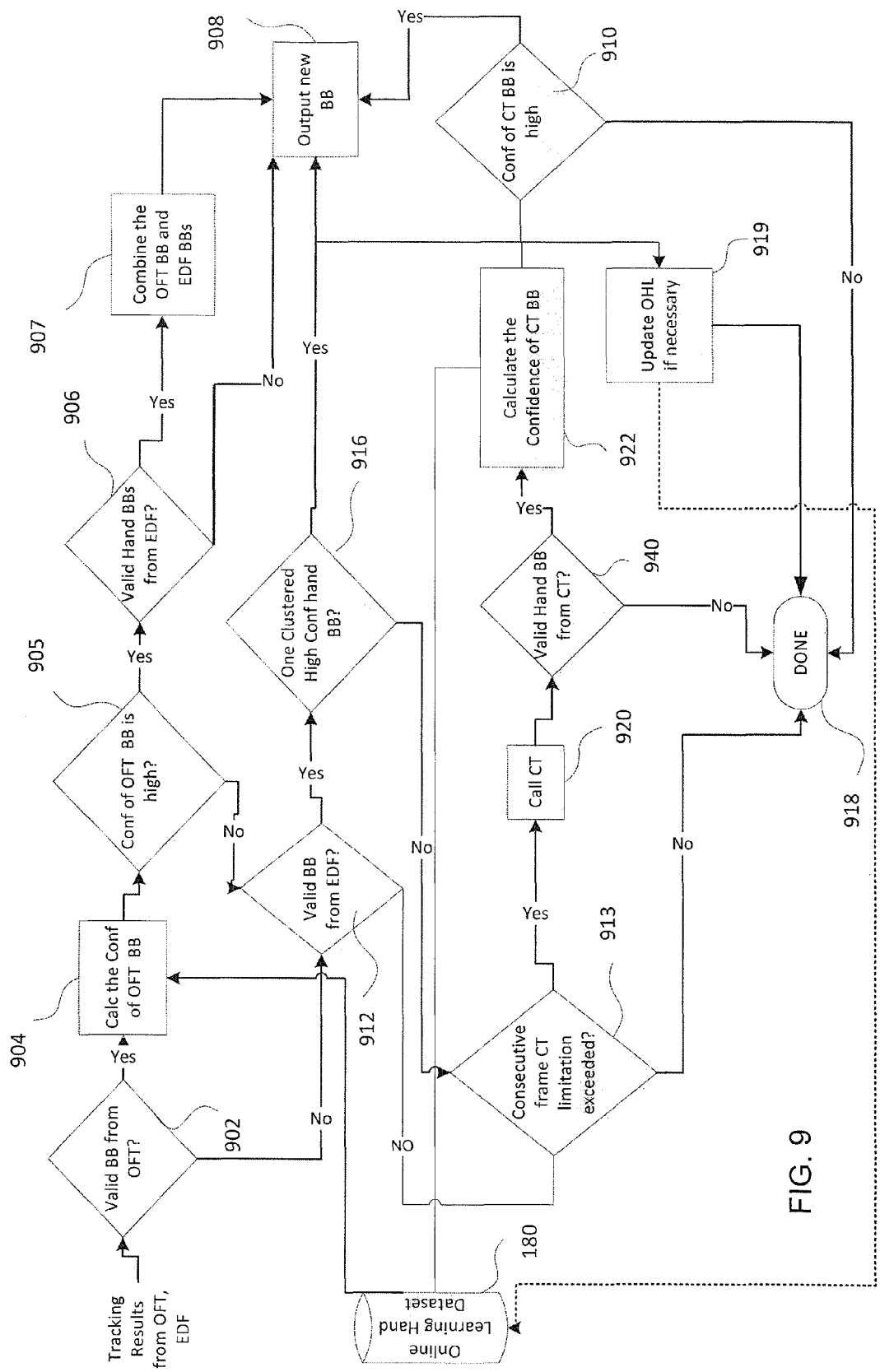
FIG. 9 is a generalized flow diagram depicting example operations of a synthesis module, in conjunction with other object tracking modules of the present disclosure.

FIG. 9 illustrates example operations of the synthesis module 160 and the process of determining how to synthesize bounding boxes from the tracking modules 130, 140, 150. The processes depicted in FIG. 9 are for explanatory purposes only and, without limiting the scope of this disclosure in any way, represent only one of the many available sequences and combinations of interchangeable processes and methods which are described and covered herein.

At 902 the synthesis module 160 determines whether an OFT bounding box has been obtained for a frame being analyzed. If an OFT bounding box has been received, a first possible sequence of operations may begin by the synthesis module 160 referencing the online learning dataset 180 to calculate a confidence metric for the bounding box, as depicted at 904. At 905, if the confidence metric is below a set confidence threshold, the synthesis module proceeds to 912. Otherwise, if the confidence of the OFT bounding box is above the set threshold, the synthesis module determines if at least one bounding box has been received from the EDF module 140 at 907. If an EDF bounding box has been received, the synthesis module 160 outputs a final bounding box at 908. The final bounding box is based on the OFT and EDF bounding boxes. The position of the final bounding box may be determined by a weighting formula in which the position of the ODF and EDF bounding boxes are independent variables. The weighting formula may be such that the final bounding box location is influenced more by the location of the OFT bounding box than the EDF bounding box(es). At 910, the online hierarchy learning module 122 is provided with the most recent OFT, EDF and final bounding box locations so that it may update the online learning dataset library using the methods described previously.

Returning now to 902, if the synthesis module instead determines that an OFT bounding box has not been received, it executes a second sequence of operations beginning at 912. At 912, the synthesis module 160 determines whether an EDF bounding box has been provided. If the synthesis module 160 has not been provided with at least one EDF bounding box, the synthesis module 160 seeks an input from the color tracker module at 913.

With reference again to 912, if at least one EDF bounding box has been provided, the synthesis module 160 uses the EDF bounding box confidence metric and/or clustering metrics to determine if at least one provided bounding box is a high confidence bounding box with strong clustering (e.g. associated with a confidence metric or clustering metric which are above set thresholds), as depicted at 916.

If a high confidence bounding box with strong clustering has been provided, the synthesis module outputs this EDF bounding box as the final bounding box at 908 and provides the EDF and final bounding box locations to the OHL 122 so that it may update the online learning dataset 180. The processing or actions associated with updating of the online learning dataset are depicted at 919.

If a high confidence bounding box with strong clustering has not been received, the synthesis module verifies, at 913, if a condition preventing color tracker module 150 activation is in place. The condition may be a CT module frame limit, as described previously, or any other restriction which limits or controls the use of the CT module 150. If the condition is in place, synthesis module 160 terminates processing of the present frame at 918. Otherwise, color tracker module 150 is called at 920. If a valid bounding box is not received from the CT module 25 at 922, synthesis module 160 terminates processing of the present frame at 918.

If a CT bounding box is provided at 922, the synthesis module uses the online learning dataset to determine the confidence metric of the bounding box. If the confidence is low (e.g. below a threshold confidence), the synthesis module discontinues processing and does not return a boundary box for the frame. If the confidence is high (e.g. above a predetermined threshold confidence), the synthesis module outputs a final bounding box at 908 which is based on the CT bounding box position.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Figure 10:
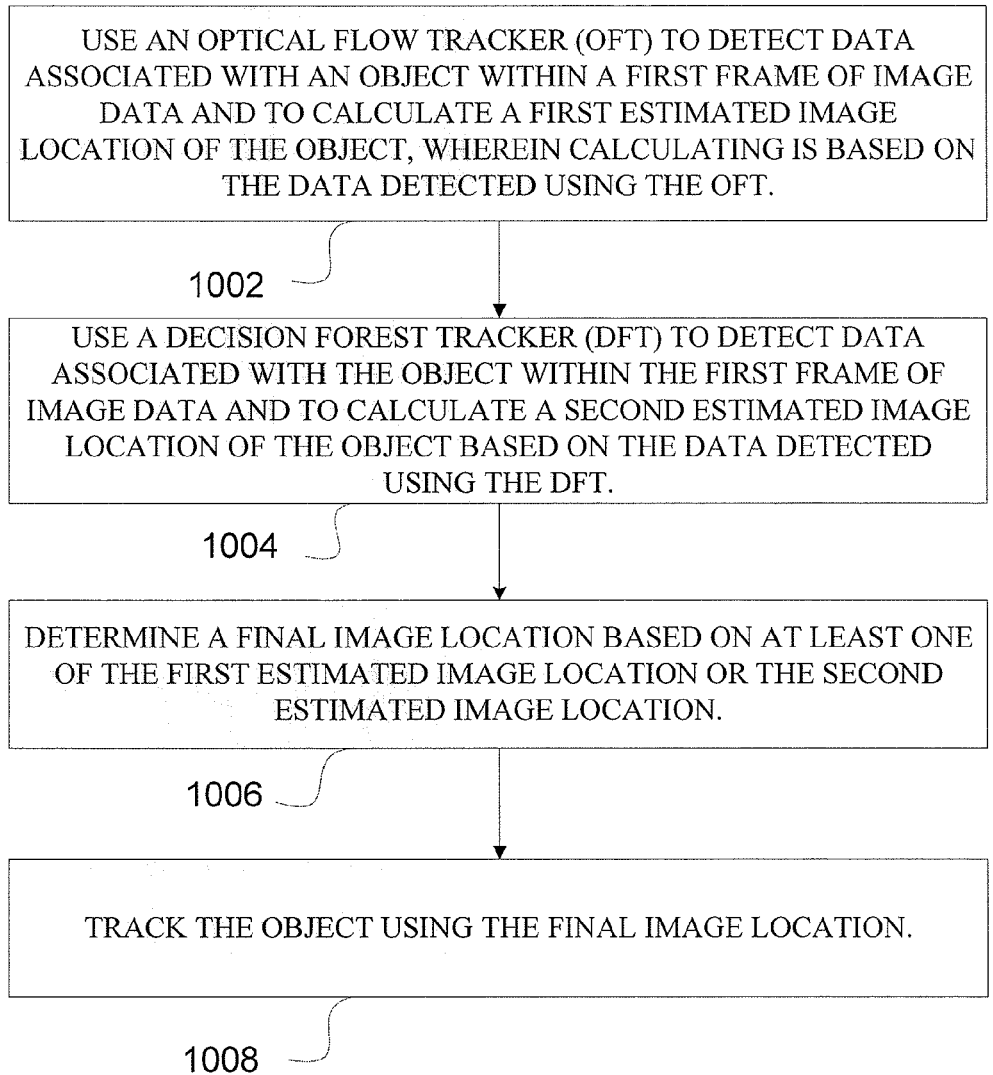
FIG. 10 is a flow diagram describing example tracking operations for an object tracker of the present disclosure.

FIG. 10 is a flow diagram depicting object tracking processes executable by an object tracker of the present disclosure. At 1002, the object tracker of the present disclosure may use an optical flow tracker (OFT) to detect data associated with an object within a first frame of image data and to calculate a first estimated image location of the object, wherein calculating is based on the data detected using the OFT. As discussed previously the OFT may be embodied in a processing module such as OFT module 130 residing within or separate from processor 110. The OFT module 140 may employ the Lucas-Kanade algorithm as disclosed previously.

At 1004, the object tracker may use a decision forest tracker (DFT) to detect data associated with the object within the first frame of image data and to calculate a second estimated image location of the object based on the data detected using the DFT. The DFT may be embodied in an enhanced decision forest tracker module such as EDF module 130. The module may be disposed as part of a processor such as processor 110. The second estimated image location may be calculated using techniques such as those described previously herein, including one or more of the techniques discussed with reference to FIGS. 5-8. Calculating the first estimated image location may involve generating an OFT bounding box using any one or more of the techniques disclosed previously with regards to OFT module 130. Calculating the second estimated image location may involve generating an EDF bounding box using any one or more of the techniques disclosed previously with regards to EDF module 140.

At 1006, the object tracker may define a final image location based on at least one of the first estimated image location or the second estimated image location. Defining the final image location may be done by a processing module such as synthesis module 160. Synthesis module 160 may reside within a processor such as the processor 110. Defining the final first frame bounding box may include one or more of the techniques disclosed in FIG. 1A, 3 or 9, for example.

At 1008, the object tracks the object using the final first frame bounding box. The tracking may comprise providing the final first frame bounding box as tracking output. For example, a user application such as user application 120 may be provided with the tracking output.

In summary, various combinations and implementations of the techniques and methods described herein may enable, amongst other results, rapid, reliable and accurate object tracking through enhanced machine learning in the object tracking environment, a sharing of processing resources amongst independent processing modules, a reduction of computational complexity associated with object tracking, and/or a robust and efficient integration of multiple object tracking modules into a single object tracker.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for optical object tracking, the method comprising:
    using an optical flow tracker (OFT) to detect data associated with an object within a first frame of image data and to calculate a first estimated image location of the object based on the data detected using the OFT;
    using a decision forest tracker (DFT) to detect data associated with the object within the first frame of image data and to calculate a second estimated image location of the object based on the data detected using the DFT;
    determining a final image location based on a synthesis of the first estimated image location and the second estimated image location;
    tracking the object using the final image location; and
    based on the final image location, updating a learning library in a first phase and a second phase subsequent to the first phase, wherein the first phase comprises providing false positive window information based on the data detected using the DFT to the learning library.

2. The method of claim 1, further comprising:
    defining a first bounding box with respect to the first estimated image location;
    defining a second bounding box with respect to the second estimated image location; and
    defining a final bounding box with respect to the final image location,
    wherein tracking the object comprises tracking the object using the final bounding box.

3. The method of claim 2, further comprising:
    determining a first confidence metric representative of a reliability of the first bounding box; and
    determining a second confidence metric representative of the reliability of the second bounding box.

4. The method of claim 3, wherein updating the learning library comprises providing data to the learning library, wherein the provided data is associated with at least one of the data detected using the DFT or the data detected using the OFT.

5. The method of claim 4, wherein:
    determining the first confidence metric comprises calculating the reliability of the first bounding box based on an amount of consistency between the data detected using the OFT and data stored in the learning library; and
    determining the second confidence metric comprises calculating the reliability of the second bounding box based on an amount of consistency between the data detected using the DFT and data stored in the learning library.

6. The method of claim 4, further comprising:
    ascertaining at least one of a shape, size, velocity or luminance of the object based on the data provided to the learning library, wherein said ascertained shape, size, velocity or luminance is stored in the learning library, and wherein calculating the second image location of the object is further based on a result of said information ascertained based on the data provided to the learning library.

7. The method of claim 3, wherein determining the final image location comprises:
    determining the final image location to be within the second bounding box if the first confidence metric is less than a first predetermined threshold and the second confidence metric exceeds a second predetermined threshold;

determining the final image location to be between the first and the second bounding box if the first confidence metric exceeds the first predetermined threshold and the second confidence metric exceeds the second predetermined threshold; and determining the final image location to be within the first bounding box if the first confidence metric exceeds the first predetermined threshold and the second confidence metric is less than the second predetermined threshold.

8. The method of claim 4, further comprising:
analyzing a second frame of image data using the OFT, wherein analyzing the second frame using the OFT does not lead to a detection of the object;
analyzing the second frame of image data using the DFT, wherein analyzing the second frame using the DFT does not lead to a detection of the object;
using a color tracker to detect second frame data associated with the object within the second frame of image data;
using the color tracker to calculate a third estimated image location of the object, wherein calculating is based on the second frame data associated with the object;
defining a color tracker bounding box located around the third estimated image location; and
determining a color tracker confidence metric representative of the reliability of the color tracker bounding box.

9. The method of claim 8, wherein determining a color tracker confidence metric comprises:
comparing the second frame data to the data provided to a learning library, the provided data being associated with at least one of the data detected using the DFT or the data detected using the OFT; and
calculating the reliability of the color tracker bounding box based on an amount of consistency between the detected second frame data and the data provided to the learning library.

10. The method of claim 8, wherein using a color tracker to detect second frame data associated with the object comprises using a graphics processing unit (GPU) to implement the color tracker algorithm.

11. The method of claim 1, wherein the first frame of image data includes multiple pixel values, and wherein using the DFT to detect data associated with the object comprises:
defining a first window associated with a portion of pixel values included in the first frame; and
analyzing the portion of pixel values with which the first window is associated, wherein analyzing the portion of pixel values comprises determining whether the analyzed portion of pixel values corresponds to an image of the object.

12. The method of claim 11, wherein analyzing the portion of pixel values further comprises:
analyzing multiple feature vectors, wherein each of the multiple feature vectors comprises a sequence of multiple binary values, each binary value of the sequence indicating a result of a unique pixel value comparison involving a unique pair of pixel values, each of the unique pairs consisting of pixel values corresponding to the portion of pixel values with which the first window is associated, and wherein analyzing multiple feature vectors comprises analyzing a first and second one of the multiple feature vectors using a decision tree,
wherein the decision tree includes multiple leaves and one level of decision tree branching, and wherein each of the multiple leaves:
corresponds to a unique sequence of binary values; and
indicates a probability factor belonging to a set of probability factors, each probability factor in the set being indicated by at least one of the included multiple leaves.

13. The method of claim 12, wherein:
analyzing the first and second feature vectors using a decision tree comprises determining a first and second leaf of the decision tree, the determined first leaf corresponding to a sequence of binary values which matches the analyzed first feature vector and the determined second leaf corresponding to a sequence of binary values which matches the analyzed second feature vector;
and wherein the method further comprises:
determining a first probability factor indicated by the determined first leaf; and
determining a second probability factor indicated by the determined second leaf,
and wherein:
determining whether the analyzed portion of pixel values corresponds to an image of the object comprises summing the first probability factor and the second probability factor;
using the DFT to detect data associated with the object further includes:
defining multiple additional windows, each of the additional windows located at a different part of the first frame, wherein each additional window includes pixel values in the first frame which are not included in the first window; and
for each additional window, estimating a likelihood that the window corresponds to an image of the object.

14. The method of claim 13, further comprising:
identifying a first spatial clustering of similarly located windows from amongst the first window and the additional windows, the first spatial clustering comprising windows having a high estimated likelihood of corresponding to an image of the object,
and wherein calculating a second estimated image location of the object comprises calculating the second estimated image location based on a location of the first spatial clustering.

15. The method of claim 14, wherein false positive window information is data associated with a window which:
is either the first window or one of the additional windows;
does not overlap the final bounding box;
has a high estimated likelihood of corresponding to the image; and
is not part of the first spatial clustering,
and wherein the second phase comprises:
using the DFT to identify data associated with the object in a third frame of image data, the third frame occurring after the first frame;
using the data associated with the object in the third frame to calculate a fourth estimated image location of the object, wherein the fourth estimated image location corresponds to multiple overlapping windows in a second spatial clustering; and
providing true positive information to the learning library, wherein the true positive information which associates each of the multiple overlapping windows with the object.

16. The method of claim 1, further comprising:
using the OFT to detect data associated with an object within a third frame of image data and to calculate a third estimated image location of the object based on the data detected using the OFT;

using the DFT to evaluate the data associated with the object within the third frame of image data;
tracking the object using the third estimated image location, wherein using the third estimated image location is based on the evaluation of the data using the DFT.

17. An apparatus for optical object tracking, the apparatus comprising:
an optical flow tracker (OFT) configured to detect data associated with an object within a first frame of image data and calculate a first estimated image location of the object, wherein the OFT is configured to calculate the first estimated image based on the data which the OFT is configured to detect;
a decision forest tracker (DFT) configured to detect data associated with the object within the first frame of image data and calculate a second estimated image location of the object, wherein the DFT is configured to calculate the second estimated image location based on the data which the DFT is configured to detect, wherein at least one of the OFT or the DFT is further configured to, based on the final image location, update a learning library in a first phase and a second phase subsequent to the first phase, wherein the first phase comprises providing false positive window information based on the data detected using the DFT to the learning library;
a processing module configured to:
determine a final image location based on a synthesis of the first estimated image location and the second estimated image location; and
track the object using the final image location.

18. The apparatus of claim 17, wherein:
the OFT is further configured to define a first bounding box with respect to the first estimated image location;
the DFT is further configured to define a second bounding box with respect to the second estimated image location; and
the processing module is further configured to define a final bounding box with respect to the final image location.

19. The apparatus of claim 18, wherein the processing module is further configured to:
determine a first confidence metric representative of the reliability of the first bounding box; and
determine a second confidence metric representative of the reliability of the second bounding box.

20. The apparatus of claim 19, wherein the processing module is further configured to determine the final image location based further on the first confidence metric and the second confidence metric.

21. The apparatus of claim 20, wherein updating the learning library comprises providing data to the learning library.

22. The apparatus of claim 21, wherein the processing module is configured to:
calculate the reliability of the first bounding box based on an amount of consistency between the data which the OFT is configured to detect and data stored in the learning library; and
calculate the reliability of the second bounding box based on an amount of consistency between the data which the DFT is configured to detect and data stored in the learning library.

23. The apparatus of claim 22, wherein the data stored in the learning library corresponds to an image of the object in frames previous to the first frame.

24. The apparatus of claim 23, wherein the DFT is further configured to:
ascertain a shape, size, velocity or luminance of the object based on the data provided to the learning library, wherein said ascertained shape, size, velocity or luminance is stored in the online library; and
calculate the second estimated image location based further on a result of said ascertaining which the DFT is configured to perform.

25. The apparatus of claim 23, wherein the processing module is further configured to determine the final image location by:
determining the final image location to be within the second bounding box if the first confidence metric is less than a first predetermined threshold and the second confidence metric exceeds a second predetermined threshold; and
determining the final image location to be between the first and the second bounding box if the first confidence metric exceeds the first predetermined threshold and the second confidence metric exceeds the second predetermined threshold; and
determining the final image location to be within the first bounding box if the first confidence metric exceeds the first predetermined threshold and the second confidence metric is less than the second predetermined threshold.

26. The apparatus of claim 21, wherein:
the OFT is further configured to analyze a second frame of image data;
the DFT is further configured to analyze the second frame of image data,
and wherein the apparatus further comprises a color tracker, and wherein the color tracker is configured to:
detect second frame data associated with the object within the second frame of image data, wherein detecting second frame data comprises detecting the second frame data when both OFT analysis and DFT analysis of the second frame does not result in a detection of the object;
calculate a third estimated image location of the object, wherein calculating is based on the second frame data associated with the object;
define a color tracker bounding box with respect to the third estimated image location; and
calculate a color tracker confidence metric representative of the reliability of the color tracker bounding box.

27. The apparatus of claim 26, wherein the color tracker is further configured to calculate the color tracker confidence metric by:
comparing the second frame data to the data provided to the learning library; and
calculating the reliability of the color tracker bounding box based on an amount of consistency between the detected second frame data and the data provided to the learning library.

28. The apparatus of claim 27, wherein the color tracker is implemented within a graphics processing unit (GPU).

29. The apparatus of claim 21, wherein the first frame of image data includes multiple pixel values, and wherein the DFT is further configured to detect data associated with the object by:
defining a first window associated with a portion of the pixel values included in the first frame; and
analyzing the portion of pixel values with which the first window is associated, wherein analyzing the portion of pixel values comprises determining whether the analyzed portion of pixel values corresponds to an image of the object.

30. The apparatus of claim 29, wherein the DFT is configured to analyze the portion of pixel values by:

analyzing multiple feature vectors, wherein each of the multiple feature vectors comprises a sequence of multiple binary values, each binary value of the sequence indicating a result of a unique pixel value comparison involving a unique pair of pixel values, each of the unique pairs consisting of pixel values corresponding to the portion of pixel values with which the first window is associated, and wherein analyzing multiple feature vectors comprises analyzing a first and second one of the multiple feature vectors using a decision tree, wherein the decision tree includes multiple leaves and one level of decision tree branching, and wherein each of the multiple leaves:

corresponds to a unique sequence of binary values; and indicates a probability factor belonging to a set of probability factors, each probability factor in the set being indicated by at least one of the included multiple leaves.

31. The apparatus of claim 30, wherein:

analyzing the first and second feature vectors using a decision tree comprises determining a first and second leaf of the decision tree, the determined first leaf corresponding to a sequence of binary values which matches the analyzed first feature vector and the determined second leaf corresponding to a sequence of binary values which matches the analyzed second feature vector, wherein the DFT is further configured to:

determine a first probability factor indicated by the determined first leaf; and determine a second probability factor indicated by the determined second leaf, wherein determining whether the analyzed portion of pixel values corresponds to an image of the object comprises summing the first probability factor and the second probability factor, and wherein the DFT is further configured to detect data associated with the object by:

defining multiple additional windows, each of the additional windows located at a different part of the first frame, wherein each additional window includes pixel values in the first frame which are not included in the first window; and estimating, for each additional window, a likelihood that the window corresponds to an image of the object.

32. The apparatus of claim 31, wherein the DFT is further configured to:

identify a first spatial clustering of similarly located windows from amongst the first window and the additional windows, the first spatial clustering comprising windows having a high estimated likelihood of corresponding to an image of the object; and calculate a second estimated image location of the object by calculating the second estimated image location based on a location of the first spatial clustering.

33. The apparatus of claim 32, wherein false positive window information is data associated with a window which:

is either the first window or one of the additional windows;

does not overlap the final bounding box;

has a high estimated likelihood of corresponding to the image; and is not part of the first spatial clustering, and wherein the second phase comprises:

using the DFT to identify data associated with the object in a third frame of image data, the third frame occurring after the first frame;

using the data associated with the object in the third frame to calculate a fourth estimated image location of the object, wherein the fourth estimated image location corresponds to multiple overlapping windows in a second spatial clustering; and providing true positive information to the learning library, wherein the true positive information associates each of the multiple overlapping windows with the object.

34. The apparatus of claim 17, wherein:

the OFT is further configured to detect data associated with the object within a third frame of image data and to calculate a third estimated image location of the object based on the data which it is configured to detect;

the DFT is further configured to evaluate the data associated with the object within the third frame of image data;

the processing module is further configured to:

track the object using the third estimated image location, wherein using the third estimated image location is based on the evaluation of the data using DFT.

35. An apparatus for optical object tracking, the apparatus comprising:

means for using an optical flow tracker (OFT) to detect data associated with an object within a first frame of image data and to calculate a first estimated image location of the object, wherein the means for using an OFT comprise means for calculating the first estimated image based on the data detected using the OFT;

means for using a decision forest tracker (DFT) to detect data associated with the object within the first frame of image data and to calculate a second estimated image location of the object based on the data detected using the DFT;

means for determining a final image location based on a synthesis of the first estimated image location and the second estimated image location;

means for tracking the object using the final image location; and means for, based on the final image location, updating a learning library in a first phase and a second phase subsequent to the first phase, wherein the first phase comprises providing false positive window information based on the data detected using the DFT to the learning library.

36. The apparatus of claim 35, further comprising:

means for defining a first bounding box with respect to the first estimated image location;

means for defining a second bounding box with respect to the second estimated image location; and means for determining a final bounding box with respect to the final image location.

37. The apparatus of claim 36, further comprising:

means for determining a first confidence metric representative of the reliability of the first bounding box; and means for determining a second confidence metric representative of the reliability of the second bounding box.

38. The apparatus of claim 37, wherein the means for updating the learning library comprise providing data to the learning library, wherein the provided data is associated with at least one of data detected using the DFT or data detected using the OFT.

39. The apparatus of claim 38, wherein:

the means for determining a first confidence metric comprise:

means for calculating the reliability of the first bounding box based on an amount of consistency between the data detected using the OFT and data stored in the learning library; and means for determining the first confidence metric based on the reliability of the first bounding box; and the means for determining the second confidence metric comprise:
  means for calculating the reliability of the second bounding box based on an amount of consistency between the data detected using the DFT and data stored in the learning library; and
  means for determining the second confidence metric based on the reliability of the second bounding box.

40. The apparatus of claim 39, further comprising:
means for ascertaining at least one of a shape, size, velocity or luminance of the object based on the data provided to the learning library; and
means for storing said shape, size, velocity or luminance in the online library.

41. The apparatus of claim 40, wherein the means for determining the final image location comprises:
  means for determining the final image location to be within the second bounding box if the first confidence metric is less than a first predetermined threshold and the second confidence metric exceeds a second predetermined threshold; and
  means for determining the final image location to be between the first and the second bounding box if the first confidence metric exceeds the first predetermined threshold and the second confidence metric exceeds the second predetermined threshold; and
  means for determining the final image location to be within the first bounding box if the first confidence metric exceeds the first predetermined threshold and the second confidence metric is less than the second predetermined threshold.

42. The apparatus of claim 41, further comprising:
means for analyzing a second frame of image data using the OFT;
means for analyzing the second frame of image data using the DFT;
means for using a color tracker to detect second frame data associated with the object within the second frame of image data;
means for using the color tracker to calculate a third estimated image location of the object, wherein calculating is based on the second frame data associated with the object;
means for defining a color tracker bounding box with respect to the third estimated image location; and
means for determining a color tracker confidence metric representative of the reliability of the color tracker bounding box.

43. A non-transitory computer readable medium with instructions stored thereon, the instructions executable to cause a computer to:
  use an optical flow tracker (OFT) to detect data associated with an object within a first frame of image data, and to calculate a first estimated image location of the object based on the data detected using the OFT;
  use a decision forest tracker (DFT) to detect data associated with the object within the first frame of image data and to calculate a second estimated image location of the object based on the data detected using the DFT;
  determine a final estimated image location based on a synthesis of the first estimated image location and the second estimated image location;
  track the object using the final estimated image location; and
  based on the final image location, update a learning library in a first phase and a second phase subsequent to the first phase, wherein the first phase comprises providing false positive window information based on the data detected using the DFT to the learning library.

44. The computer readable medium of claim 43, wherein the instruction are further executable to cause the computer to:
  define a first bounding box with respect to the first estimated image location;
  define a second bounding box with respect to the second estimated image location; and
  define a final bounding box with respect to the final image location.

* * * * *